United States Patent
Yokoyama et al.

(10) Patent No.: US 9,840,948 B2
(45) Date of Patent: Dec. 12, 2017

(54) METHOD FOR SUPPLYING INERT GAS INTO POPPET VALVE INTERMEDIATE AND APPARATUS FOR SUPPLYING INERT GAS INTO POPPET VALVE INTERMEDIATE

(71) Applicant: NITTAN VALVE CO., LTD., Kanagawa (JP)

(72) Inventors: Hisanaga Yokoyama, Kanagawa (JP); Shigeru Uchida, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 15/504,845

(22) PCT Filed: Oct. 28, 2015

(86) PCT No.: PCT/JP2015/080433
§ 371 (c)(1),
(2) Date: Feb. 17, 2017

(87) PCT Pub. No.: WO2017/072885
PCT Pub. Date: May 4, 2017

(65) Prior Publication Data
US 2017/0276031 A1    Sep. 28, 2017

(51) Int. Cl.
*F01L 3/14*    (2006.01)
*B21K 1/22*    (2006.01)
(Continued)

(52) U.S. Cl.
CPC ...... *F01L 3/14* (2013.01); *B21K 1/22* (2013.01); *B23P 15/002* (2013.01); *F16K 49/007* (2013.01); *Y10T 29/49307* (2015.01)

(58) Field of Classification Search
CPC ....... B23P 15/002; B21C 23/002; B21K 1/22; F16K 49/00; F16K 1/36; F01L 3/14;
(Continued)

(56) References Cited

U.S. PATENT DOCUMENTS

2012/0246936 A1* 10/2012 Morii .................... B23P 15/002
                                                          29/890.132
2016/0279746 A1    9/2016 Mishima et al.

FOREIGN PATENT DOCUMENTS

JP    05-071316 A    3/1993
JP    2012112358 A   6/2012
(Continued)

OTHER PUBLICATIONS

Examiners Decision for Patent (Allowance) issued in the corresponding Japanese Application No. 2016-504834.

*Primary Examiner* — Sarang Afzali
(74) *Attorney, Agent, or Firm* — Roberts Mlotkowski Safran Cole & Calderon P.C.

(57) ABSTRACT

A method and an apparatus for supplying inert gas into a poppet valve intermediate are provided that are capable of properly filling the inert gas without waste into the poppet valve intermediate of any size. After a negative pressure is achieved by suction in an internal space (Win) of a poppet valve intermediate (W) as compared to an ambient pressure (Pa) of the poppet valve intermediate (W), the inert gas is supplied into the internal space (Win) until a pressure (F) of the internal space (Win) reaches the ambient pressure (Ps) of the poppet valve intermediate (W).

21 Claims, 16 Drawing Sheets

(51) Int. Cl.
 *B23P 15/00* (2006.01)
 *F16K 49/00* (2006.01)
(58) Field of Classification Search
 CPC ..... F01L 3/24; F01L 2103/01; F01L 2103/00; Y10T 29/49307
 See application file for complete search history.

(56) References Cited

FOREIGN PATENT DOCUMENTS

| | | |
|---|---|---|
| JP | 5735721 B1 | 6/2015 |
| WO | 2012086316 A1 | 6/2012 |
| WO | 2014122858 A1 | 8/2014 |

\* cited by examiner

METHOD FOR SUPPLYING INERT GAS INTO POPPET VALVE INTERMEDIATE AND APPARATUS FOR SUPPLYING INERT GAS INTO POPPET VALVE INTERMEDIATE

TECHNICAL FIELD

The present invention relates to a method for supplying inert gas into a poppet valve intermediate and an apparatus for supplying inert gas into a poppet valve intermediate.

BACKGROUND ART

A poppet valve having a cooling medium metal stored therein tends to be used in an internal-combustion engine so as to reduce a thermal load. When the cooling medium metal is stored into the poppet valve, a poppet valve intermediate is prepared that has an internal space having an opening on one axial end side, and is arranged with the opening on one axial end side facing upward and, after the inert gas is filled into the internal space of the poppet valve intermediate, the cooling medium metal is supplied from the opening on one axial end side of the poppet valve intermediate before the opening on one axial end side of the poppet valve intermediate is closed. As a result, not only can the cooling medium metal be stored inside (in the internal space) of the poppet valve, the cooling medium metal can be prevented from being oxidized by an air initially present in the internal space of the poppet valve intermediate, so as to enable the cooling medium metal to produce original heat transfer performance thereof.

In a proposed method of filling an inert gas into the internal space of the poppet valve intermediate, as described in Patent Document 1, a poppet valve intermediate is arranged such that an opening on one axial end side thereof faces upward with a nozzle inserted into near the bottom part of the internal space of the poppet valve intermediate, and the nozzle is moved upward while an inert gas is ejected from the nozzle. According to this method, as the nozzle moves upward, the inert gas is supplied into the internal space of the poppet valve intermediate continuously from the lower side thereof and, when the nozzle is moved outside the internal space of the poppet valve intermediate, the internal space of the poppet valve intermediate is entirely filled with the inert gas in place of the original air.

PRIOR ART DOCUMENT

Patent Document

Patent Document 1: Japanese Patent No. 5735721

SUMMARY OF THE INVENTION

Problem to be Solved by the Invention

However, if the inert gas supply method as described above is used, the poppet valve intermediate is limited to a size in which a nozzle can be inserted into the internal space from the opening on one end side.

Additionally, because of the configuration of ejecting the inert gas from the nozzle into the poppet valve intermediate (internal space) opened to the atmosphere, the inert gas basically tends to easily leak outside from the opening on one end side of the poppet valve intermediate and, moreover, if a rate of ejection of the inert gas from the nozzle is slow, an air is drawn into the internal space from the outside due to a change in occupying volume of the nozzle in the internal space as the nozzle moves upward and, therefore, the rate of ejection of the inert gas from the nozzle must be made higher to increase an ejection amount so as to certainly prevent the air from being drawn in, which is associated with an inevitable increase in amount of inert gas wastefully leaking outside from the opening on one end side of the poppet valve intermediate.

The present invention was conceived in view of the situations and a first object thereof is to provide a method for supplying inert gas into a poppet valve intermediate such that the inert gas can properly be filled without waste into the poppet valve intermediate of any size.

A second object is to provide an apparatus for supplying inert gas into a poppet valve intermediate such that the inert gas can properly be filled without waste into the poppet valve intermediate of any size.

Means for Solving Problem

To achieve the first object, the present invention has configurations of (1) to (10).

(1) In a method for supplying inert gas into a poppet valve intermediate in which an object to be supplied with inert gas is a poppet valve intermediate having an internal space with an opening on one axial end side, the poppet valve intermediate being arranged with the opening on one axial end side facing upward, the inert gas being supplied from the opening on one axial end side of the poppet valve intermediate before supplying a cooling medium metal into the internal space of the poppet valve intermediate, the method is configured such that after a negative pressure is achieved by suction in the internal space of the poppet valve intermediate as compared to an ambient pressure of the poppet valve intermediate, the inert gas is supplied to the internal space until a pressure of the internal space reaches the ambient pressure of the poppet valve intermediate.

According to this configuration, even without inserting a nozzle ejecting an inert gas into the internal space of the poppet valve intermediate, the inert gas can actively be led into the internal space of the poppet valve intermediate by utilizing the fact that the internal space of the poppet valve intermediate is under the negative pressure as compared to the ambient pressure of the poppet valve intermediate. On the other hand, a form of supply of the inert gas can be achieved in a form preventing the inert gas from leaking out from the opening on one axial end side of the poppet valve intermediate based on the fact that the inside of the internal space is under the negative pressure until the pressure inside the internal space of the poppet valve intermediate reaches the ambient pressure of the poppet valve intermediate.

(2) Under the configuration of (1), a supply/discharge adjuster is prepared that is capable of switching adjustment between a negative-pressure suction and a supply of inert gas;

first, the supply/discharge adjuster is brought into contact with an opening circumferential edge portion on one axial end side of the poppet valve intermediate to close the opening on one axial end side of the poppet valve intermediate;

the negative-pressure suction is then performed through adjustment of the supply/discharge adjuster to make the pressure inside the internal space of the poppet valve intermediate lower than the ambient pressure of the poppet valve intermediate; and the inert gas is then supplied through the switching adjustment of the supply/discharge adjuster into the internal space of the poppet valve intermediate until the inside of the internal space reaches the ambient pressure of the poppet valve intermediate.

According to this configuration, the inert gas can be filled into the internal space of the poppet valve intermediate simply by adjusting the supply/discharge adjuster (negative-pressure suction, supply of inert gas) after bringing the supply/discharge adjuster into contact with the opening circumferential edge portion on one axial end side of the poppet valve intermediate to close the opening on one axial end side, which eliminates the need for inserting a nozzle ejecting an inert gas into the internal space of the poppet valve intermediate. Therefore, the poppet valve intermediate is no longer limited by the nozzle and the inert gas can be filled into the poppet valve intermediate of any size.

On the other hand, the inert gas is supplied into the internal space of the poppet valve intermediate under a pressure lower than the ambient pressure of the poppet valve intermediate until the pressure reaches the ambient pressure of the poppet valve intermediate, the form of supply of the inert gas can be achieved in a form preventing the inert gas from leaking out from the opening on one axial end side of the poppet valve intermediate. Moreover, even if the supply/discharge adjuster is subsequently removed from the poppet valve intermediate so as to supply the cooling medium metal, since the pressure inside the internal space of the poppet valve intermediate is the ambient pressure of the poppet valve intermediate, the inert gas filled in the poppet valve intermediate is prevented from leaking out from the opening on one axial end side of the poppet valve intermediate. Therefore, the inert gas can properly be filled without waste into the poppet valve intermediate.

(3) Under the configuration of (2), both operations of the negative-pressure suction and the supply of the inert gas to the inside of the internal space of the poppet valve intermediate are performed at the same working position, and after completion of both of the operations, the poppet valve intermediate is conveyed to a supply station of the cooling medium metal constituting the next process.

According to this configuration, not only can the inert gas properly be filled without waste into the poppet valve intermediate, but also the poppet valve intermediate after being filled with the inert gas can sequentially be sent out to the next process and, accordingly, a new poppet valve intermediate can be received to fill the poppet valve intermediate with the inert gas. Therefore, the inert gas filling process to the poppet valve intermediate can be prevented from affecting an increase in cycle time (time until one poppet valve is manufactured).

(4) Under the configuration of (2), the supply/discharge adjuster is also used as a conveying tool to convey the supply/discharge adjuster to a supply station of the cooling medium metal constituting the next process while the poppet valve intermediate is sucked to the supply/discharge adjuster based on the negative-pressure suction, and after the supply/discharge adjuster is conveyed to the cooling medium metal supply station, the switching adjustment of the supply/discharge adjuster is performed to supply the inert gas into the internal space of the poppet valve intermediate.

According to this configuration, by utilizing the fact that the poppet valve intermediate is sucked to the supply/discharge adjuster based on the negative-pressure suction, the supply/discharge adjuster can be used as the conveying tool to immediately convey the poppet valve intermediate to the supply station of the cooling medium metal. After conveying to the supply station of the cooling medium metal, the inert gas can be supplied into the poppet valve intermediate, thereby separating the poppet valve intermediate from the supply/discharge adjuster and filling the inert gas into the poppet valve intermediate. Therefore, the negative-pressure suction and the supply of the inert gas by the supply/discharge adjuster not only can be utilized for filling the inert gas into the poppet valve intermediate but also can effectively be utilized for conveying the poppet valve intermediate.

(5) Under the configuration of (4), the poppet valve intermediate is prepared that has an opening on one axial end side thereof opened in a leading end surface of a diameter expansion part of the poppet valve intermediate, and when the poppet valve intermediate is sucked to the supply/discharge adjuster based on the negative-pressure suction, the leading end surface of the diameter expansion part of the poppet valve intermediate is sucked to the supply/discharge adjuster.

According to this configuration, the suction strength of the poppet valve intermediate to the supply/discharge adjuster can be made higher and, even if the poppet valve intermediate is swung when the poppet valve intermediate is conveyed by using the supply/discharge adjuster as the conveying tool, the suction relationship between the supply/discharge adjuster and the poppet valve intermediate can strongly be maintained. Therefore, even when the supply/discharge adjuster acts as the conveying tool to convey the poppet valve intermediate, the poppet valve intermediate can properly be conveyed to the supply station of the cooling medium metal.

(6) Under the configuration of (2), the supply/discharge adjuster is used that includes a supply/discharge passage for selectively performing the negative-pressure suction and the supply of the inert gas; the supply/discharge passage has an opening opened to the outside; and when the supply/discharge adjuster comes into contact with the opening circumferential edge portion on one axial end side of the poppet valve intermediate, the opening of the supply/discharge passage faces the opening on one axial end side of the poppet valve intermediate.

According to this configuration, simply by bringing the supply/discharge adjuster into contact with the opening circumferential edge portion on one axial end side of the poppet valve intermediate to close the opening on one axial end side of the poppet valve intermediate, the supply/discharge passage can be utilized to selectively perform the negative-pressure suction and the supply of the inert gas, and the effect of (2) described above can specifically be implemented.

(7) Under the configuration of (2), the negative-pressure suction and the supply of the inert gas are repeated multiple times.

According to this configuration, even if the performance of equipment performing the negative-pressure suction is low, the proportion of the inert gas to the whole can be increased.

(8) Under the configuration of (1), nitrogen or argon is used as the inert gas.

This configuration enables utilization of the fact of having the same level of weight as air in the case of nitrogen and the property of being sufficiently heavier than air in the case of argon, so that the inert gas can specifically and properly be filled into the poppet valve intermediate.

(9) Under the configuration of (8), at least an ambient atmosphere of the poppet valve intermediate is an inert gas atmosphere.

According to this configuration, even if the inert gas leaks out from inside the internal space of the poppet valve intermediate, the inert gas around the poppet valve intermediate comes into the internal space of the poppet valve intermediate so that variations in amount of the inert gas filled into the internal space can be suppressed.

(10) Under the configuration of (1), since the ambient pressure of the poppet valve intermediate is the same pressure as the atmospheric pressure, unlike the case under the special pressure, the inert gas can easily be supplied into the poppet valve intermediate.

To achieve the second object, the present invention has configurations of (11) to (17).

(11) In an apparatus for supplying inert gas into a poppet valve intermediate in which an object to be supplied with inert gas is a poppet valve intermediate having an internal space with an opening on one axial end side, the apparatus having a support supporting the poppet valve intermediate with the opening on one axial end side facing upward, the inert gas being supplied from the opening on one axial end side of the poppet valve intermediate into the internal space of the poppet valve intermediate while the poppet valve intermediate is supported by the support, the apparatus is configured to comprise a supply/discharge adjuster arranged to be capable of coming into contact with and separating from an opening circumferential edge portion on one axial end side of the poppet valve intermediate, the supply/discharge adjuster closing the opening on one axial end side when coming into contact with the opening circumferential edge portion on one axial end side of the poppet valve intermediate, wherein the supply/discharge adjuster is set to have achievable switching forms including a negative-pressure suction form and an inert gas supply form, wherein in the negative-pressure suction form, when the supply/discharge adjuster is located on the opening circumferential edge portion on one axial end side of the poppet valve intermediate, negative-pressure suction is performed in the internal space of the poppet valve intermediate until reaching a setting pressure lower than an ambient pressure of the poppet valve intermediate, and wherein in the inert gas supply form, when the pressure inside the internal space of the poppet valve intermediate reaches the setting pressure due to the negative-pressure suction form, the inert gas is supplied into the internal space of the poppet valve intermediate until the pressure inside the internal space reaches the ambient pressure of the poppet valve intermediate.

According to this configuration, even without inserting a nozzle ejecting an inert gas into the internal space of the poppet valve intermediate, the inert gas can be filled into the poppet valve intermediate and, when the inert gas is supplied into the poppet valve intermediate, the inert gas can be prevented from leaking out from the opening on one axial end side of the poppet valve intermediate. Therefore, this configuration enables the provision of the apparatus for supplying inert gas into a poppet valve intermediate using the method according to (2).

(12) Under the configuration of (11), the supply/discharge adjuster includes a supply/discharge passage for selectively performing the negative-pressure suction and the supply of the inert gas, and the supply/discharge passage has an opening facing the opening on one axial end side when the supply/discharge adjuster comes into contact with the opening circumferential edge portion on one axial end side of the poppet valve intermediate.

This configuration enables the provision of the apparatus for supplying inert gas into a poppet valve intermediate using the method according to (6).

(13) Under the configuration of (12), the apparatus comprises an ascending/descending mechanism causing the supply/discharge adjuster to vertically ascend and descend in a region above the poppet valve intermediate supported by the support, and the ascending/descending mechanism is set to cause the supply/discharge adjuster to descend on the opening circumferential edge portion on one axial end side of the poppet valve intermediate when the negative-pressure suction form is performed, and to ascend when the pressure inside the internal space of the poppet valve intermediate reaches the ambient pressure of the poppet valve intermediate after the negative-pressure suction form is performed.

This configuration enables the provision of the apparatus for supplying inert gas into a poppet valve intermediate using the method according to (3).

(14) Under the configuration of (12), the apparatus comprises a conveying mechanism conveying the supply/discharge adjuster as a conveying tool, the conveying mechanism is set to reciprocate the supply/discharge adjuster between a first working position on the opening circumferential edge portion on one axial end side of the poppet valve intermediate and a second working position for the next process, and the supply/discharge adjuster is set to perform the negative-pressure suction form when moving from the first working position to the second working position and to perform the inert gas supply form instead of the negative-pressure suction form when arriving at the second working position.

This configuration enables the provision of the apparatus for supplying inert gas into a poppet valve intermediate using the method according to (4).

(15) Under the configuration of (14), the poppet valve intermediate is used that has an opening on one axial end side opened in a leading end surface of a stem part of the poppet valve intermediate, the supply/discharge adjuster includes a cylindrical guide member extending downward around the opening of the supply/discharge passage, and the inner diameter of the guide member set to allow insertion of the stem part of the poppet valve intermediate.

According to this configuration, even though the opening on one axial end side of the poppet valve intermediate is opened in the leading end surface of the stem part of the poppet valve intermediate and the leading end surface of the stem part is sucked to the supply/discharge adjuster, the swinging of the poppet valve intermediate is regulated by the guide member when the supply/discharge adjuster is used as the conveying tool to convey the poppet valve intermediate. Therefore, even when the supply/discharge adjuster conveys the poppet valve intermediate with the leading end surface of the stem part sucked thereto, the poppet valve intermediate can properly be conveyed to the next process (the supply station of the cooling medium metal).

(16) Under the configuration of (12), the apparatus comprises an arrangement state detector detecting that the supply/discharge adjuster is located on the opening circumferential edge portion on one axial end side of the poppet valve intermediate supported by the support, and a control unit controlling the supply/discharge adjuster;

the supply/discharge adjuster includes a pressure detecting part detecting the pressure inside the internal space of the poppet valve intermediate, a negative-pressure suction adjusting part adjusting the negative-pressure suction for the internal space of the poppet valve intermediate, and an inert gas supply adjusting part adjusting the supply of the inert gas to the internal space of the poppet valve intermediate; and the control unit is set to control the negative-pressure suction adjusting part to start the negative-pressure suction of the internal space in the poppet valve intermediate when it is determined based on information from the arrangement state detector that the supply/discharge adjuster is located on the opening circumferential edge portion on one axial end side of the poppet valve intermediate, to control the negative-pressure suction adjusting part to stop the negative-pressure suction and to control the inert gas supply adjusting part to supply the inert gas to the internal space when it is determined based on information from the pressure detecting part that the pressure inside internal space has reached the setting pressure lower than the ambient pressure of the poppet valve intermediate, and to control the inert gas supply adjusting part to stop the supply of the inert gas when it is determined based on information from the pressure detecting part that the pressure inside the internal space has reached the ambient pressure of the poppet valve intermediate.

This configuration enables the provision of the apparatus made to specifically control the apparatus according to (12).

(17) Under the configuration of (13), the apparatus comprises a setting state detector detecting that the poppet valve intermediate is supported by the support, an arrangement state detector detecting that the supply/discharge adjuster is located on the opening circumferential edge portion on one axial end side of the poppet valve intermediate supported by the support, and a control unit controlling the ascending/descending mechanism and the supply/discharge adjuster;

the supply/discharge adjuster includes a pressure detecting part detecting the pressure inside the internal space of the poppet valve intermediate, a negative-pressure suction adjusting part adjusting the negative-pressure suction for the internal space of the poppet valve intermediate, and an inert gas supply adjusting part adjusting the supply of the inert gas to the internal space of the poppet valve intermediate; and the control unit is set to control the ascending/descending mechanism to cause the supply/discharge adjuster to descend toward the poppet valve intermediate when it is determined based on information from the setting state detector that the poppet valve intermediate is supported by the support, to control the negative-pressure suction adjusting part to start the negative-pressure suction of the internal space in the poppet valve intermediate when it is determined based on information from the arrangement state detector that the supply/discharge adjuster is located on the opening circumferential edge portion on one axial end side of the poppet valve intermediate, to control the negative-pressure suction adjusting part to stop the negative-pressure suction and to control the inert gas supply adjusting part to supply the inert gas to the internal space when it is determined based on information from the pressure detecting part that the pressure inside the internal space has reached the setting pressure lower than the ambient pressure of the poppet valve intermediate, and to control the inert gas supply adjusting part to stop the supply of the inert gas and to control the ascending/descending mechanism to cause the supply/discharge adjuster to ascend when it is determined based on information from the pressure detecting part that the pressure inside the internal space has reached the ambient pressure of the poppet valve intermediate.

This configuration enables the provision of the apparatus made to specifically control the apparatus according to (13).

(18) Under the configuration of (14), the apparatus comprises a setting state detector detecting that the poppet valve intermediate is supported by the support, a first arrangement state detector detecting that the supply/discharge adjuster is located at the first working position, a second arrangement state detector detecting that the supply/discharge adjuster is located at the second working position, and a control unit controlling the conveying mechanism and the supply/discharge adjuster;

the supply/discharge adjuster includes a pressure detecting part detecting the pressure inside the internal space of the poppet valve intermediate, a negative-pressure suction adjusting part adjusting the negative-pressure suction for the internal space of the poppet valve intermediate, and an inert gas supply adjusting part adjusting the supply of the inert gas to the internal space of the poppet valve intermediate; and the control unit is set to control the conveying mechanism to convey the supply/discharge adjuster toward the first working position when it is determined based on information from the setting state detector that the poppet valve intermediate is supported by the support, to control the negative-pressure suction adjusting part to perform the negative-pressure suction of the internal space in the poppet valve intermediate and to control the conveying mechanism to convey the supply/discharge adjuster to the second working position when it is determined based on information from the first arrangement state detector that the supply/discharge adjuster is located at the first working position, to control the negative-pressure suction adjusting part to stop the negative-pressure suction and to control the inert gas supply adjusting part to supply the inert gas to the internal space when it is determined based on information from the second arrangement state detector that the supply/discharge adjuster is located at the second working position, and to control the inert gas supply adjusting part to stop the supply of the inert gas and to control the conveying mechanism to move the supply/discharge adjuster away from the second working position when it is determined based on information from the pressure detecting part that the pressure inside the internal space has reached the ambient pressure of the poppet valve intermediate.

This configuration enables the provision of the apparatus made to specifically control the apparatus according to (14).

(19) Under the configuration of (11), nitrogen or argon is used as the inert gas.

This configuration enables the provision of the apparatus for supplying inert gas into a poppet valve intermediate using the method according to (8).

(20) Under the configuration of (19), at least an ambient atmosphere of the poppet valve intermediate is an inert gas atmosphere.

This configuration enables the provision of the apparatus for supplying inert gas into a poppet valve intermediate using the method according to (9).

(21) Under the configuration of (11), the ambient pressure of the poppet valve intermediate is the same pressure as the atmospheric pressure.

This configuration enables the provision of the apparatus for supplying inert gas into a poppet valve intermediate using the method according to (10).

Effect of the Invention

From the above, the present invention can provide the method for supplying inert gas into a poppet valve intermediate and the apparatus for supplying inert gas into a poppet valve intermediate such that the inert gas can properly be filled without waste into a poppet valve intermediate of any size.

MODES FOR CARRYING OUT THE INVENTION

Embodiments of the present invention will now be described with reference to the drawings.

Figure 1:
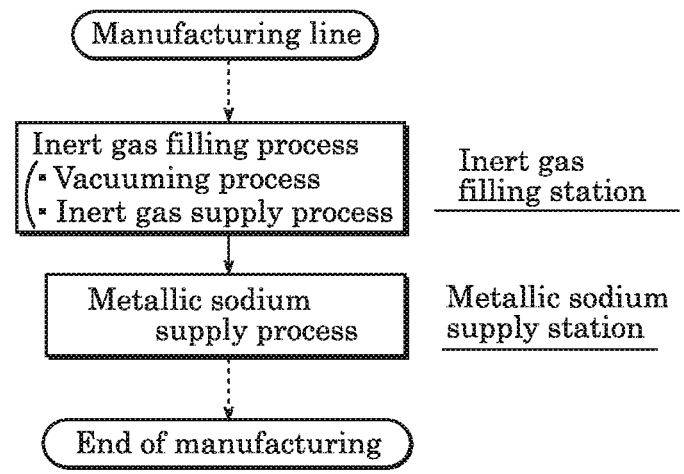
FIG. 1 is a process chart of manufacturing processes of a poppet valve according to a first embodiment.

1. FIG. 1 shows a process chart of a manufacturing line for manufacturing a poppet valve (intake/exhaust valve). Because metallic sodium acting as a cooling medium metal must be stored inside a poppet valve, this poppet valve manufacturing line must include as processes such as an inert gas filling process of filling an inert gas and a process of supplying metallic sodium acting as a cooling medium metal subsequent to the inert gas filling process. In this embodiment, at least stations constituting the processes after the inert gas filling process in this manufacturing line are present in an inert gas atmosphere (e.g., nitrogen atmosphere) under the same pressure as the atmospheric pressure.

Figure 2:
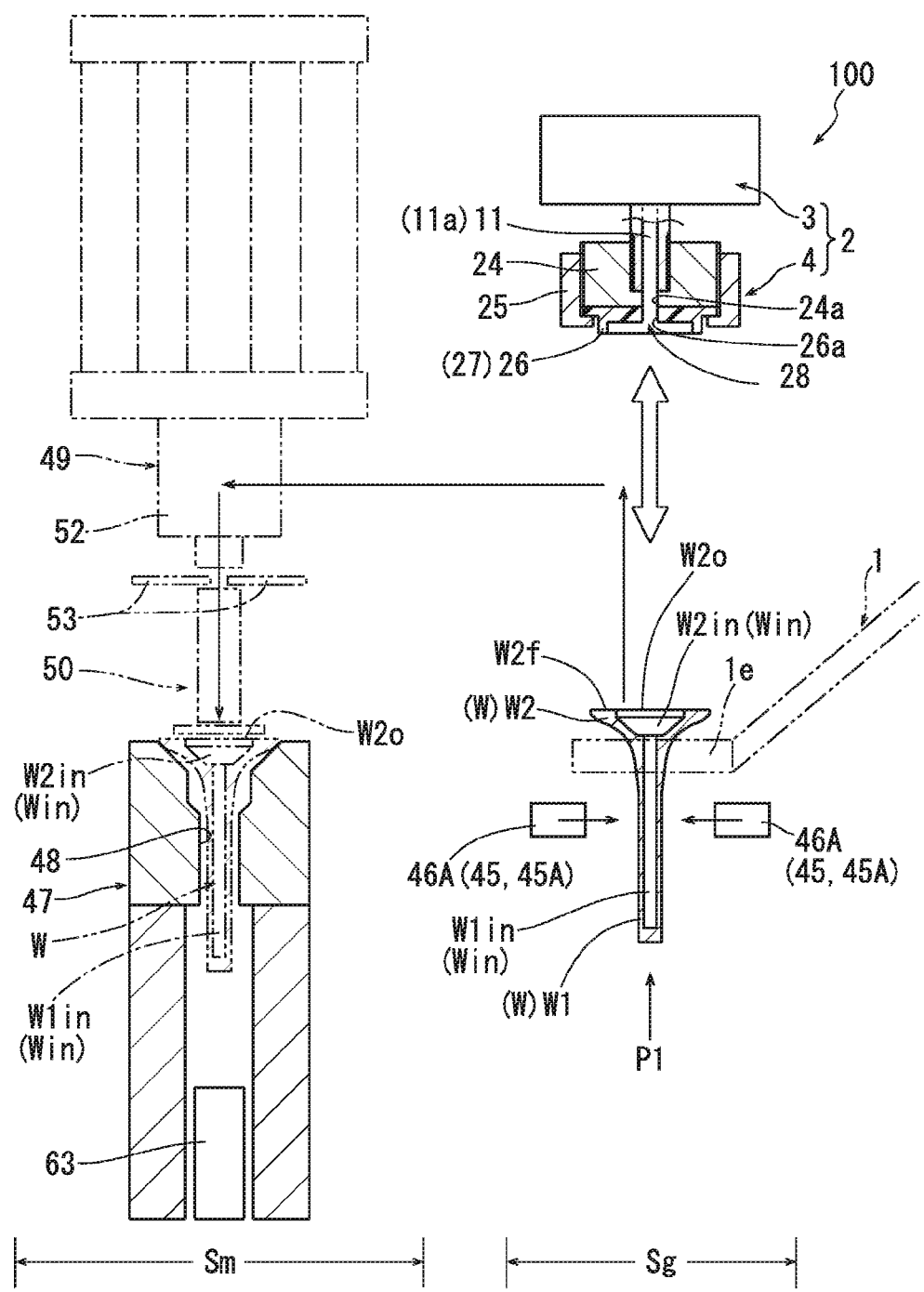
FIG. 2 is an explanatory view for explaining an arrangement relationship between an inert gas filling station and a metallic sodium supply station, a supply/discharge adjuster, and a movement route of a poppet valve intermediate in a first embodiment.
Figure 3:
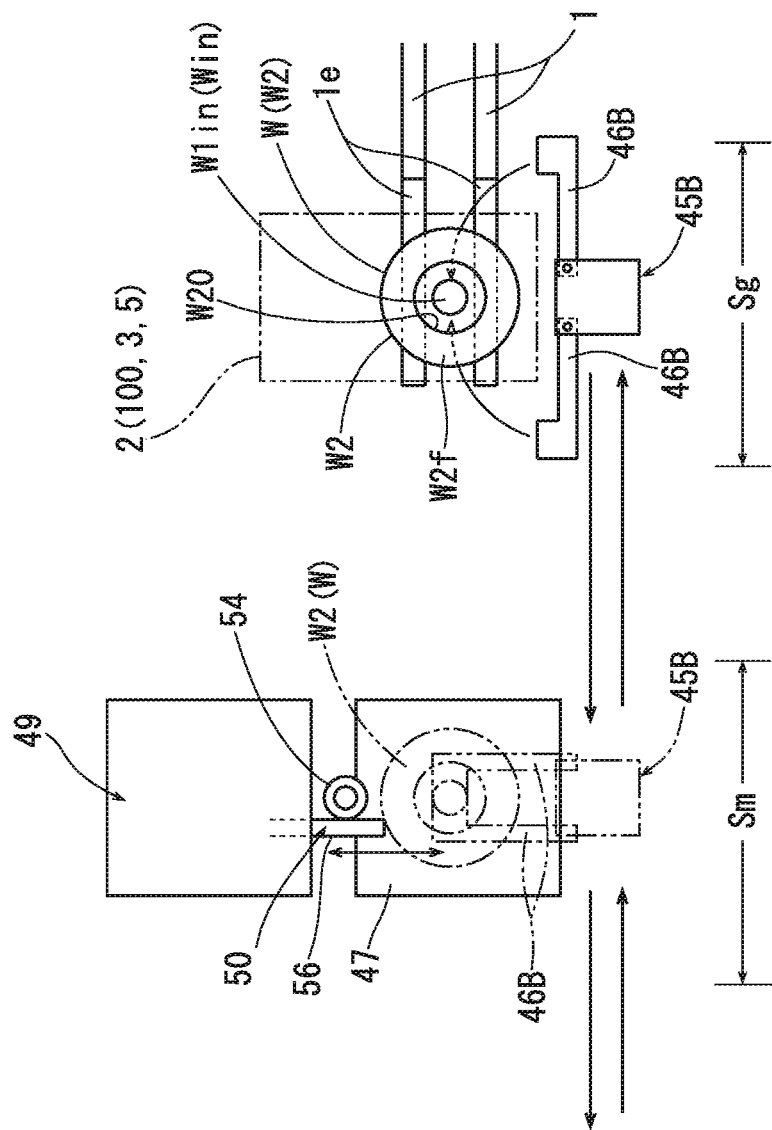
FIG. 3 is a simplified plane view of the arrangement relationship between the inert gas filling station and the metallic sodium supply station in the first embodiment.
Figure 4:
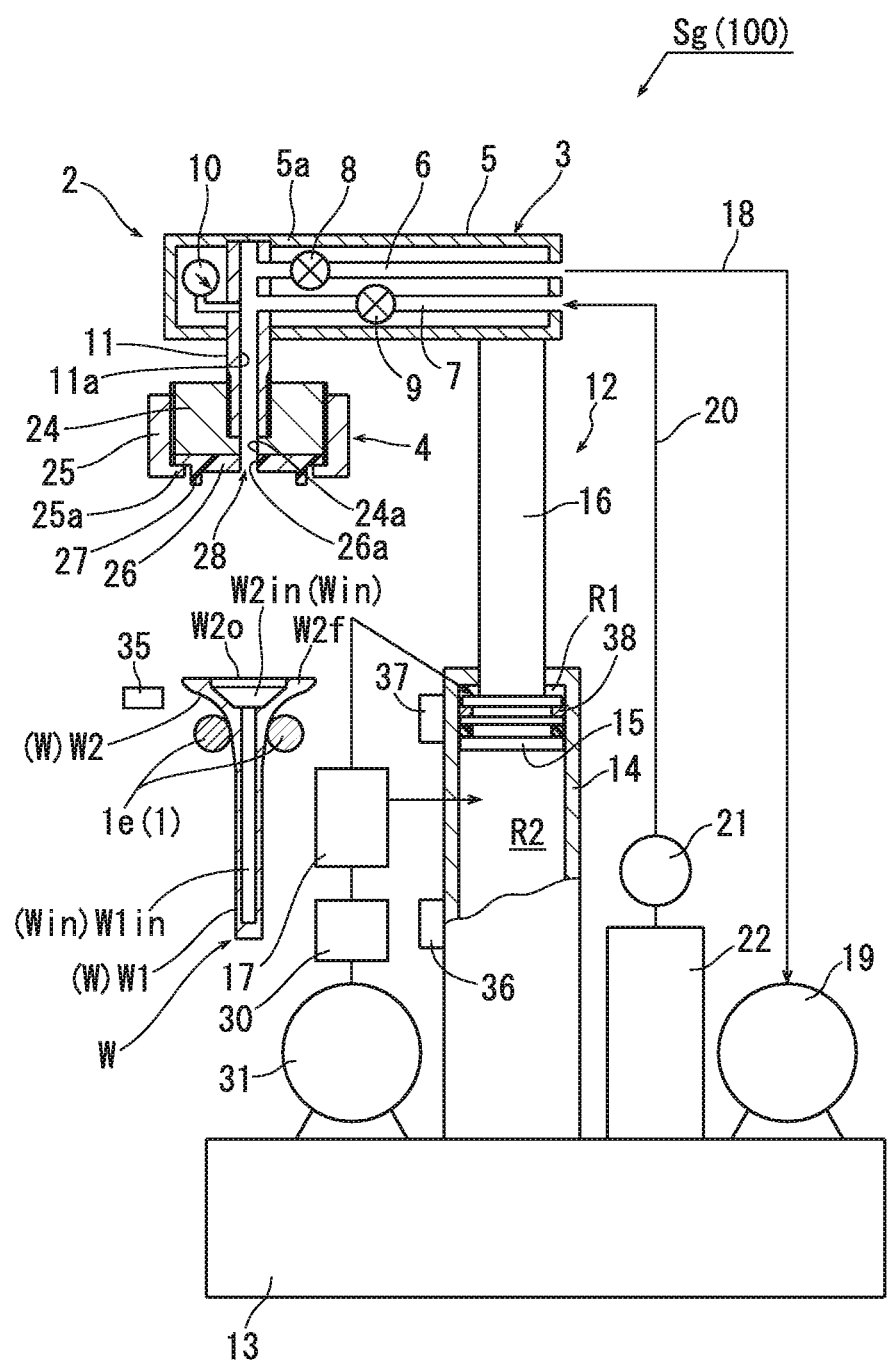
FIG. 4 is a partially cutaway side view for explaining an inert gas supplying apparatus according to the first embodiment.

2. As shown in FIGS. 2 to 4, the manufacturing line has a pair of guide rails 1 (so-called "chute") disposed as a conveying means between an inert gas filling station Sg performing the inert gas filling process and a station (not shown) performing the previous process so as to convey a poppet valve intermediate (hereinafter referred to as a valve intermediate) W at a stage in the middle of manufacturing of a poppet valve.

(1) As shown in FIGS. 2 and 4, the valve intermediate W is already processed into a basic valve shape before being conveyed into the inert gas filling station Sg, and the valve intermediate W includes a stem part W1, and n head part W2 (diameter expansion part) integrated on one axial end side (hereinafter referred to as one end side) of the stem part W1 and having a diameter expanded as compared to the stem part W1. The valve intermediate W has an internal space Win formed therein from the head part W2 to the stem part W1, and the internal space Win is formed as a recess W2in opened to the outside in the head part W2 and is formed in the stem part W1 as a stem-shaped space W1in continuously extending from the recess W2in. An opening W2o of the head part W2 of the valve intermediate W as described above constitutes an opening on one axial end side of the valve intermediate W, and an opening circumferential edge portion W2f of the head part W2 defining the head-part opening W2o constitutes an opening circumferential edge portion on one axial end side of the valve intermediate W.

(2) The two guide rails 1 are at a constant distance and extended (tilted) such that a height position becomes lower toward the side from which the valve intermediate W is transferred (toward the inert gas filling station Sg). When the valve intermediate W is conveyed by using the pair of the guide rails 1, the head part W2 of the valve intermediate W bridges the pair of the guide rails 1 with the stem part W1 of the valve intermediate W hung downward between the two guide rails 1 and, as a result, the valve intermediate W slides on the pair of the guide rails 1 in accordance with the tilt of the pair of the guide rails 1 due to its own weight of the valve intermediate W and is conveyed to the inert gas filling station Sg.

3. As shown in FIGS. 2 to 4, the inert gas filling station Sg includes an inert gas supplying apparatus 100. The inert gas supplying apparatus 100 has a conveying-direction terminal end portion 1e (a left end portion in FIG. 2) of the pair of the guide rails 1 entering into the inert gas filling station Sg and constituting a support of the valve intermediate W, and a supply/discharge adjuster 2 disposed above a predetermined position P1 of the conveying-direction terminal end portion 1e of the pair of the guide rails 1 to perform vacuuming for negative-pressure suction and a supply of an inert gas to the valve intermediate W.

(1) The conveying-direction terminal end portion 1e of the pair of the guide rails 1 is bent from the other portion of the pair of the guide rails 1 and thereby extended horizontally in the direction in which the manufacturing line continues (the left direction in FIGS. 2 and 3). Therefore, when the valve intermediate W is conveyed from a conveying-direction starting end portion to the conveying-direction terminal end portion 1e of the pair of the guide rails 1, the head-part opening W2o of the valve intermediate W faces upward due to the supporting relationship described above between the valve intermediate W and the pair of the guide rails 1.

In this case, the valve intermediate W conveyed by (slid on) the pair of the guide rails 1 comes into contact with a stopper not shown and is stopped at the predetermined position P1 on the conveying-direction terminal end portion 1e of the pair of the guide rails 1.

(2) As shown in FIGS. 2 to 4, the supply/discharge adjuster 2 includes an adjustment unit 3 and a contact unit 4 disposed on the lower side of the adjustment unit 3.

(2-1) The adjustment unit 3 includes a storage case 5, a first piping 6, a second piping 7, a solenoid valve 8 acting as a negative-pressure suction adjusting part, a solenoid valve 9 acting as an inert gas supply adjusting part, and a pressure gauge 10 acting as a pressure detecting part.

(i) The storage case 5 has a shape extending in a flat state while maintaining a constant width. A portion on one end side in the extending direction of the storage case 5 (a portion on the lower end side of FIG. 3, a portion on the left end side of FIG. 4) is located above the conveying-direction terminal end portion 1e of the pair of the guide rails 1 across the pair of the guide rails 1, and a portion on the other end side in the extending direction (a portion on the upper end side of FIG. 3, a portion on the right end side of FIG. 4) is located on one side (the upper side of FIG. 3, the right side of FIG. 4) in the parallel arrangement direction (the vertical direction of FIG. 3, the horizontal direction of FIG. 4) of the pair of the guide rails 1.

A connection cylinder 11 is connected to the portion on one end side in the extending direction of the storage case 5. This connection cylinder 11 is arranged to extend in the vertical direction with an upper end portion of the connection cylinder 11 entering in the storage case 5 from below and attached to the storage case 5, and a lower end portion of the connection cylinder 11 extends downward from the storage case 5. In this case, an upper end opening of the connection cylinder 11 is closed by utilizing an upper wall part 5a of the storage case 5 and only a lower end opening of the connection cylinder 11 is opened to the outside.

The portion on the other end side in the extending direction of the storage case 5 is supported on a base 13 through a telescopic cylinder apparatus 12 constituting an ascending/descending mechanism. The telescopic cylinder apparatus 12 includes a cylinder 14, a piston 15 dividing the inside of the cylinder 14 into two upper and lower chambers R1, R2, and an extensible rod 16 having one end portion coupled to the piston 15 and the other end portion extended upward from the cylinder 14 and coupled to the storage case 5, and a compressed air is supplied to/discharged from (supplied to and discharged from) the two chambers R1, R2 in the cylinder 14 through an aft compressor 31, a pressure adjusting apparatus 30, and an adjustment valve (solenoid valve) 17. The extensible rod 16 is extended and retracted by supplying/discharging the compressed air to/from the two chambers R1, R2 in the cylinder 14 and, as the extensible rod 16 is extended and retracted, the storage case 5 ascends and descends in the vertical directions.

(ii) The first piping 6 is disposed inside the storage case 5 and extended in the extending direction of the storage case 5. The first piping 6 has one end portion connected to the connection cylinder 11 and the other end opened to the outside from the other end side in the extending direction of the storage case 5. A first hose 18 is connected at one end to the other end opening of the first piping 6 and is connected at the other end to a vacuum pump 19 on the base 13. The vacuum pump 19 is in an actuated state during operation of the manufacturing line so that the vacuuming is performed for the negative-pressure suction.

(iii) The second piping 7 is also disposed in the storage case 5 and extended in the extending direction of the storage case 5. The second piping 7 has one end portion connected to the connection cylinder 11 and the other end opened to the outside from the other end side in the extending direction of the storage case 5. A second hose 20 is connected at one end to the other end opening of the second piping 7 and is connected at the other end through a regulator (pressure adjuster) 21 to an inert gas supply source (e.g., inert gas filling cylinder) 22. The inert gas supply source 22 is in a state of supplying an inert gas during operation of the manufacturing line, and argon or nitrogen is used as the inert gas. This is because when the inert gas is filled into the valve intermediate W, argon and nitrogen have utilizable properties of being sufficiently heavier than air and having the same level of weight as air, respectively, in addition to being inert. In this embodiment, considering that the property of being sufficiently heavier than air is more important, argon is used as the inert gas.

(iV) The solenoid valve 8 is disposed in the middle of the first piping 6. Therefore, when the solenoid valve 8 is opened, the state of vacuuming can be allowed to act on the inside of a through-hole 11a of the connection cylinder 11 and, when the solenoid valve 8 is closed, the state of vacuuming can be prevented from acting on the inside of the through-hole 11a of the connection cylinder 11.

(v) The solenoid valve 9 is disposed in the middle of the second piping 7. Therefore, when the solenoid valve 9 is opened, the inert gas (argon) can be supplied into the through-hole 11a of the connection cylinder 11 and, when the solenoid valve 9 is closed, the supply of the inert gas into the through-hole 11a of the connection cylinder 11 can be stopped.

(vi) The pressure gauge 10 is connected to the connection cylinder 11. The pressure gauge 10 always detects the pressure inside the through-hole 11a of the connection cylinder 11 and the pressure detection signal thereof is output from the pressure gauge 10.

(2-2) The contact unit 4 includes a pad holder 24, a cap 25, and a pad 26.

(i) The pad holder 24 is formed into a thick disk shape. The lower end portion of the connection cylinder 11 is screwed to a radial central portion of the pad holder 24, and the pad holder 24 is attached to the underside of the storage case 5 (the adjustment unit 3) such that the plate surfaces thereof face upward and downward.

(ii) The cap 25 is formed into a cylindrical shape. A locking part 25a projecting radially inward is integrally disposed on a circumferential edge portion of an opening in one end portion of the cap 25, and the diameter of the opening on one end side is reduced as compared to the diameter of the opening on the other end side. The cap 25 has an inner circumferential surface screwed to an outer circumferential surface of the pad holder 24, and the locking part 25a faces a circumferential edge portion of an under surface of the pad holder 24.

(iii) The pad 26 is made up of a buffer material such as a rubber plate and arranged to cover the under surface of the pad holder 24. The circumferential edge portion of the pad 26 is sandwiched between the under surface of the pad holder 24 and the locking part 25a of the cap 25, and the portion other than the circumferential edge portion faces outward through the opening on one end side of the cap 25. A cylindrical projecting part 27 (integrally molded of rubber etc.) is integrally disposed on the under surface of the pad 26 in the opening on one end side of the cap 25. The projecting part 27 is concentrically arranged around an axis of the pad holder 24, and the projecting part 27 is projected lower than the opening on one end side of the cap 25. The projecting part 27 goes down in accordance with a descent of the storage case 5 based on retracting movement of the extensible rod 16 of the telescopic cylinder apparatus 12 described above and, as shown in FIG. 5, a leading end surface of the projecting part 27 is brought into contact with (seated on) a leading end surface of the head-part circumferential edge portion W2f of the valve intermediate W located at the predetermined position P1 described above (predetermined position on the conveying-direction terminal end portion 1e of the pair of the guide rails 1) so that the internal space Win of the valve intermediate W is accordingly closed. Therefore, the projecting part 27 has the inner diameter larger than the diameter of the head-part opening W2o of the valve intermediate W, and the outer diameter of the projecting part 27 is smaller than the outer diameter of the head part W2 of the valve intermediate W. In this embodiment, the inner diameter of the projecting part 27 is made somewhat larger than the diameter of the head-part opening W2o of the valve intermediate W so that the inner surface of the projecting part 27 is somewhat away on the radially outside from the head-part opening W2o when the leading end surface of the projecting part 27 is seated on (brought into contact with) the leading end surface of the head part circumferential edge portion W2f. This is for the purpose of preventing the material (e.g., rubber) of the projecting part 27 from adhering to the inner circumferential edge portion of the head-part opening of the valve intermediate W and ensuring the proper welding of a lid to the inner circumferential edge portion of the head-part opening (the closure of the head-part opening W2o).

Figure 5:
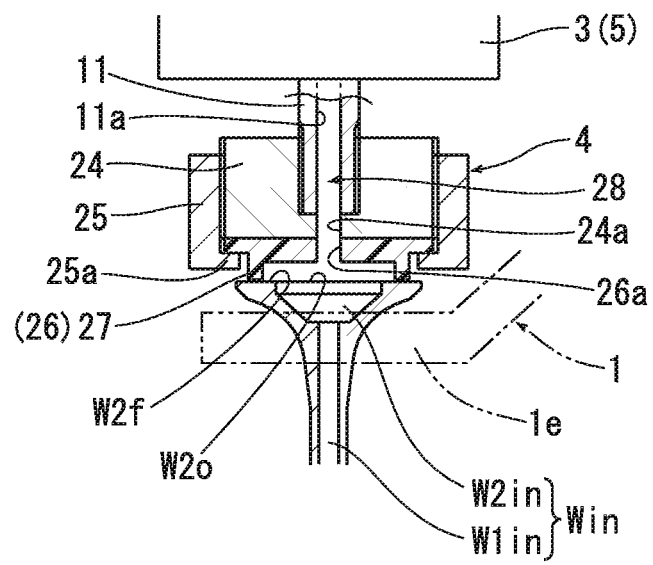
FIG. 5 is an explanatory view of a state in which the supply/discharge adjuster (contact unit) according to the first embodiment comes into contact with the poppet valve intermediate supported by a terminal end portion in a conveying direction of a pair of guide rails.

(iv) As shown in FIGS. 2, 4, and 5, the contact unit 4 is provided with a supply/discharge passage 28. The supply/discharge passage 28 is made up by using the through-hole 11a of the connection cylinder 11 and forming communication holes 24a, 26a continued to the through-hole 11a in the pad holder 24 and the pad 26, and the supply/discharge passage 28 is opened to the outside from an outer surface of the radial central portion of the pad 26.

Figure 6:
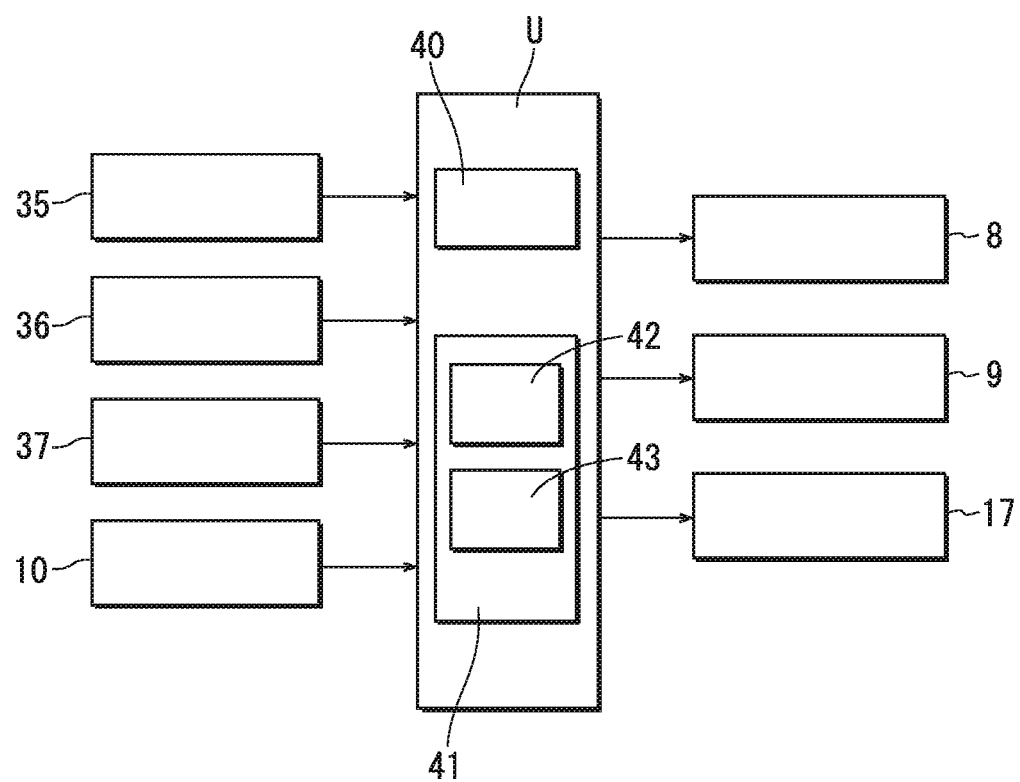
FIG. 6 is an explanatory diagram for explaining an input/output relationship in a control unit according to the first embodiment.

4. As shown in FIG. 6, the inert gas supplying apparatus 100 (the inert gas filling station Sg) includes a control unit (control means, control apparatus) U so as to control the solenoid valve (the negative-pressure suction adjusting part) 8, the solenoid valve (the inert gas supply adjusting part) 9, and the adjustment valve 17 described above.

(1) Therefore, the control unit U inputs pieces of information from a sensor (setting state detector) 35, a sensor (arrangement state detector) 36, a sensor 37, and the pressure gauge 10 (pressure detecting part) and the control unit U outputs control signals to the solenoid valve 8, the solenoid valve 9, and the adjustment valve 17.

In this case, the sensor 35 detects whether the valve intermediate W has been conveyed at the predetermined position P1 of the conveying-direction terminal end portion 1e of the pair of the guide rails 1. The sensor 36 detects whether the contact unit 4 (the supply/discharge adjuster 2) is arranged on the head-part opening circumferential edge portion W2f of the valve intermediate W on the predetermined position P1 and, in this embodiment, this is detected based on whether the sensor 36 can detect a magnet 38 attached to the piston 15 of the telescopic cylinder apparatus 12. The sensor 37 detects whether the contact unit 4 (the supply/discharge adjuster 2) is located at an original position (a retreat position above the predetermined position P1) and, in this embodiment, this is detected based on whether the sensor 37 can detect the magnet 38 attached to the piston 15 (whether the extensible rod 16 of the telescopic cylinder apparatus 12 is maximally extended). The pressure gauge 10 detects the pressure inside the through-hole 11a of the connection cylinder 11 as described above and uses this pressure detection to detect the pressure in the internal space Win of the valve intermediate W during contact between the valve intermediate W and the contact unit 4 at the predetermined position P1 (see FIG. 5).

(2) As shown in FIG. 6, the control unit U includes a storage part 40 and a control part 41 so as to ensure functions as a computer.

The storage part 40 is made up of a memory element such as a ROM (Read Only Memory) and a RAM (Random Access Memory) and the storage part 40 stores various programs, setting information, etc. necessary for filling the inert gas into the internal space Win of the valve intermediate W. These various programs etc. are read by the control part 41 as needed and necessary information is stored in the storage part 40 as appropriate.

The control part 41 is made up of a CPU (Central Processing Unit) and the control part 41 acts as a setting part 42 and an arithmetic control part 43 in accordance with deployment of the programs read from the storage part 40.

The setting part 42 sets a setting pressure Ps at which the vacuuming is terminated when the internal space Win of the valve intermediate W is evacuated, a setting pressure Pa at which the supply of inert gas is stopped when the inert gas is supplied to the internal space Win of the valve intermediate W, etc., and the arithmetic control part 43 executes arithmetic processing under the various programs based on the setting information in the setting part 42 and the input information from the sensors etc. 35 to 37, 10 to output various control signals to the solenoid valve 8, the solenoid valve 9, and the adjustment valve 17.

Figure 7:
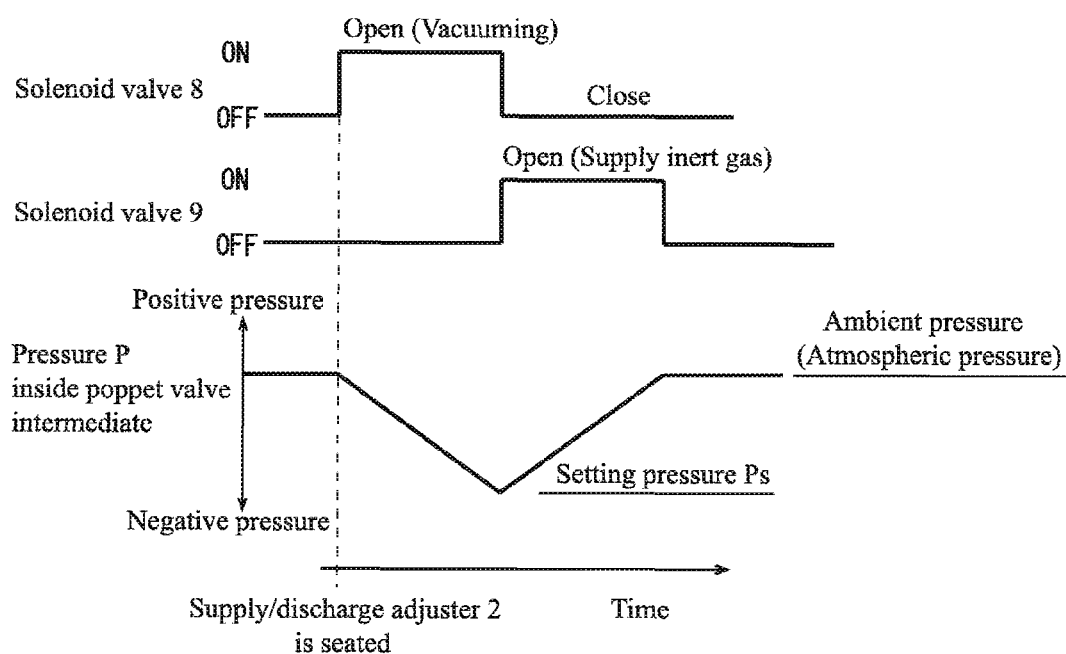
FIG. 7 is an explanatory diagram of a summary of control by the control unit according to the first embodiment.

(3) As shown in FIG. 7, a summary of the control by the control unit U is as follows.

When the presence of the valve intermediate W at the predetermined position P1 is detected, the supply/discharge adjuster 2 descends from the original position. When the sensor 36 detects that the supply/discharge adjuster 2 is seated on the head-part opening circumferential edge portion W2f of the valve intermediate W at the predetermined position P1, the solenoid valve 8 is opened (ON) to start the vacuuming. As a result, a pressure P in the valve intermediate W is continuously reduced.

When the pressure gauge 10 detects that the pressure P in the valve intermediate W is reduced to the setting pressure Ps (e.g., 160 mmHg (abs)), the solenoid valve 8 is closed (OFF) and the solenoid valve 9 is opened (ON). As a result, the inert gas is supplied instead of the vacuuming, the pressure P in the valve intermediate W is continuously increased by the supply of the inert gas.

When the pressure gauge 10 detects that the pressure P in the valve intermediate W has increased to an ambient pressure (in this embodiment, the atmospheric pressure), the solenoid valve 9 is closed (OFF). As a result, the inside of the valve intermediate W is filled with the inert gas and the supply/discharge adjuster 2 is moved upward and separated from the valve intermediate W.

Therefore, even without inserting a nozzle ejecting an inert gas into the internal space Win of the poppet valve intermediate W, the inert gas can actively be led into the internal space Win of the poppet valve intermediate W by utilizing the fact that the inside of the internal space Win of the poppet valve intermediate W is under a negative pressure as compared to the ambient pressure of the poppet valve intermediate W. Moreover, a form of supply of the inert gas can be achieved in a form preventing the inert gas from leaking out from the head-part opening W2o of the poppet valve intermediate W based on the fact that the inside of the internal space Win is under the negative pressure until the pressure inside the internal space Win of the poppet valve intermediate W reaches the ambient pressure of the poppet valve intermediate W.

Additionally, since the capacity of the internal space Win is not so large (e.g., in a range from 0.35 cm$^3$ to 1 cm$^3$) in the valve intermediate W of a typical size, the vacuuming and the supply of the inert gas can each almost momentarily be performed, and a cycle time of valve manufacturing can dramatically be shortened as compared to the case of inserting and extracting the nozzle ejecting the inert gas into and from the internal space Win of the valve intermediate W.

Figure 8:
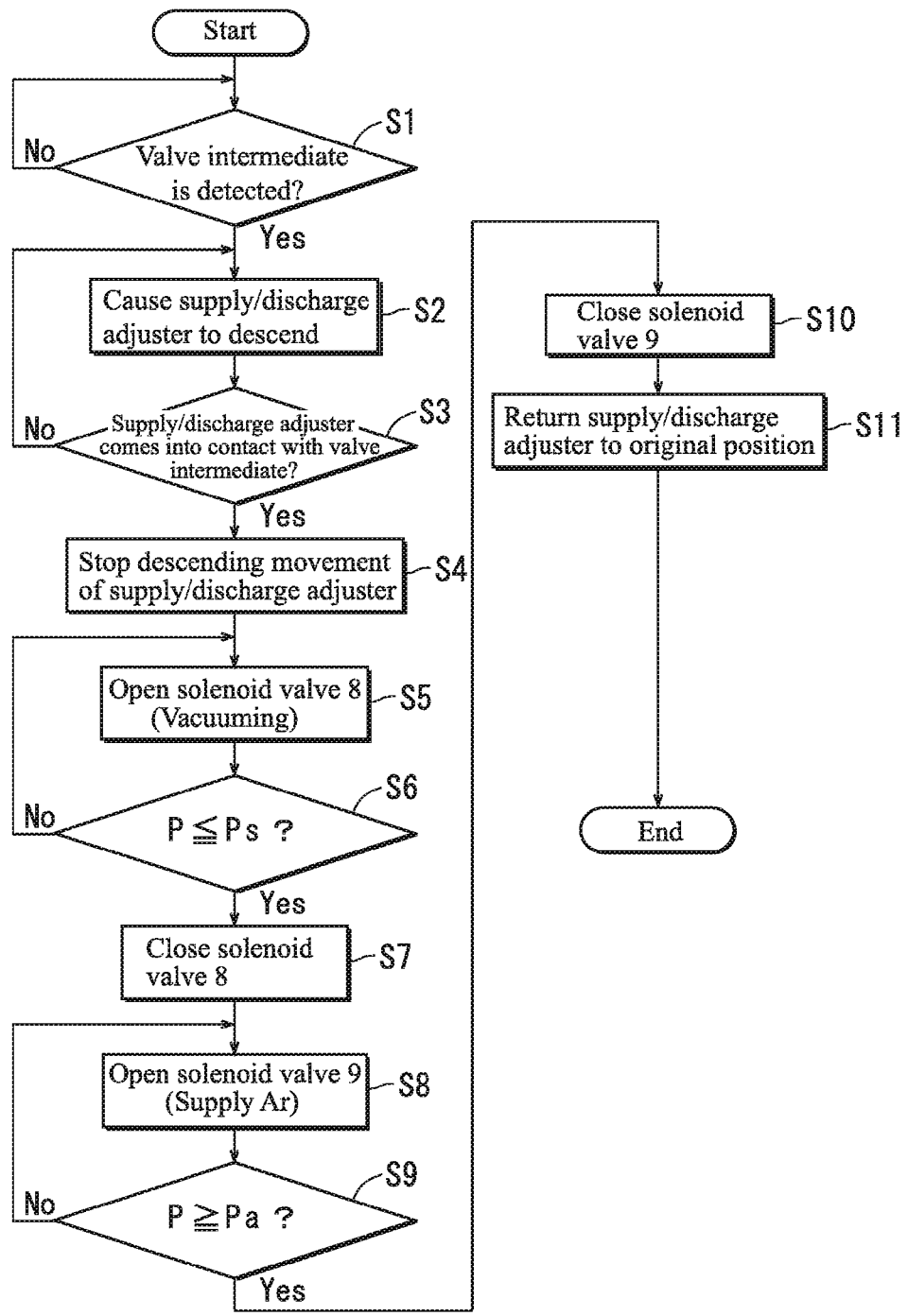
FIG. 8 is a flowchart of a control example of the control unit according to the first embodiment.

(4) A control example of the control unit U will specifically be described along with a method of supplying an inert gas into the valve intermediate W with reference to a flowchart shown in FIG. 8. It is noted that S stands for a step.

When the control is started, first, at S1, it is determined based on the information from the sensor 35 whether the valve intermediate W is present at the predetermined position P1 of the conveying-direction terminal end portion 1e of the pair of the guide rails 1. This is performed for determining whether the valve intermediate W has been conveyed at the predetermined position P1 so as to determine whether an inert gas supply process can be started. Therefore, when S1 is NO, the control is returned to S1 to continuously detect the valve intermediate W to be conveyed, and if S1 is YES, the supply/discharge adjuster 2 is caused to descend by the telescopic cylinder apparatus 12 at S2.

After the supply/discharge adjuster 2 is caused to descend at S2, it is determined at S3 based on the information from the sensor 36 whether the contact unit 4 (the projecting part 27 of the pad 26) comes into contact with the leading end surface of the head-part opening circumferential edge portion W2f of the valve intermediate W. This is performed for determining whether the internal space Win in the valve intermediate W is in a sealed state so that the vacuuming can be performed for the internal space Win. Therefore, if S3 is NO, the control is returned to S2 described above, and if S3 is YES, the descending movement of the supply/discharge adjuster 2 is stopped at S4 and the solenoid valve 8 is opened at S5. As a result, the vacuuming is performed in the internal space Win in the valve intermediate W, and the air initially present in the internal space Win is discharged.

After the vacuuming is started at S5, it is determined at S6 based on the information from the pressure gauge 10 whether the pressure P of the internal space Win in the valve intermediate W becomes equal to or lower than the setting pressure Ps lower than the ambient pressure of the valve intermediate W (in this embodiment, the same pressure as the atmospheric pressure). This is performed for smoothly performing the subsequent supply of the inert gas and for achieving the state of preventing the inert gas from leaking out from the head-part opening W2o of the valve intermediate W based on the negative pressure in the valve intermediate W during the supply. Therefore, if S6 is NO, the control is returned to S5 to continue the vacuuming and, if S6 is YES, the solenoid valve 8 is closed at S7 and the solenoid valve 9 is opened subsequently at S8. As a result, the inert gas is supplied into the valve intermediate W under the negative pressure as described above.

After the supply of the inert gas into the valve intermediate W is started at S8, it is determined at S9 whether the pressure P of the internal space Win in the valve intermediate W is increased to the ambient pressure (in this embodiment, the same pressure as the atmospheric pressure) Pa of the inert gas filling station Sg or higher. This is performed for determining the stop timing of the supply of the inert gas. Therefore, if S9 is NO, the control is returned to S7 to continue the supply of the inert gas and, if S9 is YES, the solenoid valve 9 is closed at S10 to stop the supply of the inert gas. Accordingly, at S10, the supply/discharge adjuster 2 is returned (moved up) to the original position based on the drive of the telescopic cylinder apparatus 12 and is separated from the valve intermediate W of the predetermined position P1.

Obviously, since the pressure P of the internal space Win in the valve intermediate W is the same as the ambient pressure in this state, the supply/discharge adjuster 2 is easily separated from the valve intermediate W and, even though the head-part opening W2o of the valve intermediate W is opened, the inside of the valve intermediate W is maintained in the state of being filled with the inert gas.

5. The inert gas filling station Sg is provided with a transferring apparatus 45 on the other side in the parallel arrangement direction (the lower side of FIG. 3, the left side of FIG. 4) of the pair of the guide rails 1 as shown in FIGS. 2 and 3, for transferring the valve intermediate W located at the predetermined position P1. The transferring apparatus 45 includes first and second transferring apparatuses 45A, 45B on the upper and lower sides relative to the pair of the guide rails 1, and the first transferring apparatus 45A is located on the lower side relative to the pair of the guide rails 1 (see FIG. 2) while the second transferring apparatus 45B is located on the upper side relative to the pair of the guide rails 1 (see FIG. 3).

In FIG. 2, only the first transferring apparatus 45A is shown in a simplified manner and, in FIG. 3, only the second transferring apparatus 45B is shown in a simplified manner.

(1) The first transferring apparatus 45A includes a pair of opening/closing arms 46A (shown in a simplified manner in FIG. 2) such that the pair of the arms 46A is capable of ascending and descending movement in the vertical direction. As a result, when transferring the valve intermediate W located at the predetermined position P1, the first transferring apparatus 45A uses leading end portions of the pair of the arms 46A to clamp the stem part W1 of the valve intermediate W located at the predetermined position P1, and the pair of the arms 46A is moved up by a constant length while maintaining the clamping state so that the head part W2 of the valve intermediate W is located above and away from the pair of the guide rails 1.

(2) As shown in FIG. 3, the second transferring apparatus 45B includes a pair of opening/closing arms 46B such that the pair of arms 46B ascends and descends in the vertical direction, and the second transferring apparatus 45B itself can move between a metallic sodium supply station Sm constituting a metallic sodium supply process and the inert gas supply process station Sg (see FIG. 3). Therefore, when the first transferring apparatus 45A (the pair of the arms 46A) moves the valve intermediate W upward to transfer the valve intermediate W located at the predetermined position P1, the second transferring apparatus 45B uses the pair of the arms 46B to clamp the stem part W1 of the valve intermediate W moved up from the pair of the guide rails 1, and the pair of the arms 46B ascends after waiting for a clamping release movement of the first transferrin apparatus (a pair of arms) operated in accordance with the clamping. The second transferring apparatus 45B moves to above the setting base 47 of the metallic sodium supply station Sm and causes the pair of arms 46B to descend to a predetermined descent position on arrival before opening the arms to deliver the valve intermediate W to the metallic sodium supply station Sm (see FIGS. 2 and 3). After completing this series of operations, the first and second transferring apparatuses 45A, 45B return to the original position and the original state.

Figure 9:
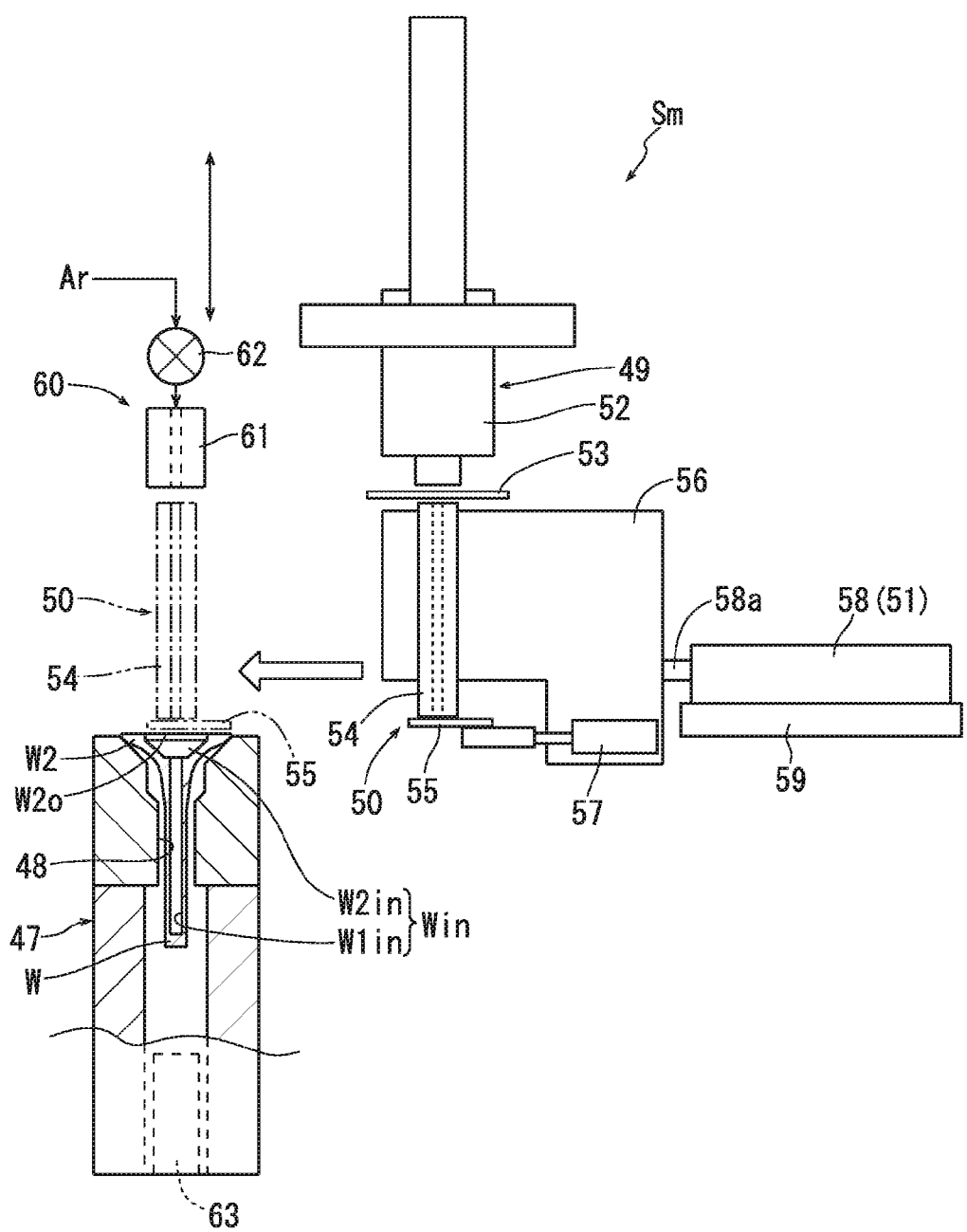
FIG. 9 is an explanatory view for explaining the metallic sodium supply station according to the first embodiment.

6. As shown in FIGS. 2, 3, and 9, the metallic sodium supply station Sm includes the setting base 47 receiving the valve intermediate W, an extrusion machine 49 extruding metallic sodium downward, a dispensing holder apparatus 50 conveying the metallic sodium extruded from the extrusion machine 49 to above the setting base 47, a holder moving apparatus 51 moving the dispensing holder apparatus 50 between the extrusion machine 49 and the setting base 47, and an inert-gas ejecting apparatus 60 extruding from the dispensing holder apparatus 50 the metallic sodium conveyed by the dispensing holder apparatus 50.

(1) As shown in FIG. 3, the setting base 47 is located in an extension region of the conveying-direction terminal end portion 1e of the pair of the guide rails 1. As shown in FIGS. 2 and 9, a setting hole 48 receiving the valve intermediate W is formed in the setting base 47. The setting hole 48 is opened upward and has an opening diameter and an opening shape allowing insertion of the stem part W1 of the valve intermediate W while supporting the head part W2. Therefore, when the setting hole 48 receives the valve intermediate W from the second transferring apparatus 45B, the valve intermediate W is set with the head-part opening W2o facing upward as is the case with the inert gas filling station Sg.

(2) As shown in FIGS. 3 and 9, the extrusion machine 49 is disposed on one side in the parallel arrangement direction of the pair of the guide rails 1 (on the upper side of FIG. 3) and is in an arrangement relationship of being offset from the setting base 47 in the parallel arrangement direction of the pair of the guide rails 1. The extrusion machine 49 includes an extrusion machine body 52 extruding metallic sodium into a rod shape and a cutting apparatus 53 cutting a constant length of the rod-shaped metallic sodium extruded downward from the extrusion machine body 52, which are located at a constant distance above the upper surface of the setting base 47 under a state of being offset from the setting base 47 (see FIG. 9).

(3) As shown in FIG. 9, the dispensing holder apparatus 50 includes a cylindrical holder 54 capable of storing a constant amount of metallic sodium and a shutter valve 55 adjusting retention and discharge of metallic sodium in the holder 54. The holder 54 is attached to a base plate 56 with the axis thereof directed vertically, and the shutter valve 55 is disposed on the lower end side of the holder 54 to open and close a lower-end opening of the holder 54 in accordance with the drive of the actuator 57 attached to the base plate 56.

(4) As shown in FIG. 9, the holder moving apparatus 51 includes a telescopic cylinder apparatus 58 including an extensible rod 58a, and a leading end portion of the extensible rod 58a is coupled to the base plate 56. The telescopic cylinder apparatus 58 moves the holder 54 attached to the base plate 56 in accordance with the extending/retracting movement of the extensible rod 58a to a metallic sodium receiving position with the upper end surface thereof located on the lower side of the extrusion machine 49 (a solid line state of FIG. 9) and a metallic sodium discharging position with the lower end surface thereof facing the setting hole 48 of the setting base 47 (a virtual line state of FIG. 9).

It is noted that reference numeral 59 denotes a fixed base supporting the telescopic cylinder apparatus 58.

(5) As shown in FIG. 9, the inert-gas ejecting apparatus 60 is disposed above the setting base 47. The inert-gas ejecting apparatus 60 is capable of ascending and descending movement in the vertical direction in accordance with an ascending/descending apparatus not shown, and the inert-gas ejecting apparatus 60 includes a nozzle 61, an inert gas supply source (not shown: in this embodiment, an argon supply source) communicating with the nozzle 61, and n solenoid valve 62 interposed between the nozzle 61 and the inert gas supply source.

The nozzle 61 is set such that the nozzle may be located at a retreat position separated upward from the upper surface of the setting base 47 at a distance equal to or greater than the axial length of the valve intermediate W and an actuated position separated upward from the upper surface of the setting base 47 at a distance somewhat longer than the axial length of the holder 54 based on the ascending and descending movement of the inert-gas ejecting apparatus 60 and, when the holder 54 is moved to the metallic sodium discharging position above the setting base 47, the nozzle 61 is located at the actuated position to face the upper end surface of the holder 54 in proximity thereto, or otherwise, the nozzle 61 is located at the retreat position.

The inert gas supply source is in a state of supplying the inert gas, and the supply of the inert gas to the nozzle 61 is adjusted by the solenoid valve 62.

With regard to the solenoid valve 62, when the nozzle 61 is located at the actuated position, the solenoid valve 62 is opened to eject the inert gas from the nozzle 61. As a result, the inert gas enters from the upper end opening of the holder 54 to the inside thereof, and the metallic sodium in the holder 54 is extruded downward.

(6) When receiving the valve intermediate W from the second transferring apparatus 45B, the metallic sodium supply station Sm as described above has the nozzle 61 located at the retreat position and, under such a state, the valve intermediate W is conveyed by the second transferring apparatus 45B to the setting base 47 and the valve intermediate W is set in the setting hole 48 of the setting base 47.

When it is confirmed that the valve intermediate W is set in the setting hole 48 of the setting base 47, the holder moving apparatus 51 is driven to move the holder 54 to the metallic sodium discharging position (see virtual line of FIG. 9). In this case, before the holder moving apparatus 51 is driven, a constant amount of rod-shaped metallic sodium extruded from the extrusion machine 49 is put into the holder 54, and the shutter valve 55 is in the closed state so as to keep the metallic sodium inside the holder 54.

When it is confirmed that the holder 54 is moved to the metallic sodium discharging position, the nozzle 61 descends to the actuated position and, subsequently, the shutter valve 55 is opened and the solenoid valve 62 is opened. As a result, the inert gas is ejected from the nozzle 61 and the metallic sodium in the holder 54 is pushed into the valve intermediate W from a lower end opening of the holder 54.

When it is confirmed that the metallic sodium in the holder 54 is pushed out and that the inside of the holder 54 is empty, the nozzle 61 is returned to the retreat position while the shutter valve 55 is closed, and the holder moving apparatus 51 is driven to return the holder 54 to the original position. Metallic sodium is newly supplied from the extrusion machine 49 into the holder 54 returned to the original position.

On the other hand, when it is confirmed that the nozzle 61 is moved to the retreat position and that the holder 54 is returned to the original position, the valve intermediate W having the metallic sodium stored therein is conveyed to stations constituting a process of compressing the metallic sodium in the valve intermediate W and a process of closing the head-part opening W2o of the valve intermediate W (lid welding processing) and a valve W is competed by going through the stations.

In FIGS. 2 and 9, reference numeral 63 denotes an ejector pin used when the valve intermediate W having the metallic sodium stored therein is transferred from the setting base 47.

7. FIGS. 10 to 18 show a second embodiment and FIG. 19 shows a third embodiment. In these embodiments, the same constituent elements as the first embodiment will be denoted by the same reference numerals and will not be described.

8. The second embodiment shown in FIGS. 10 to 18 is a variation example of the first embodiment and represents an example in which the supply/discharge adjuster 2 is also utilized as a conveying tool by focusing on the fact that the supply/discharge adjuster 2 and the valve intermediate W are integrated when the supply/discharge adjuster 2 is in a vacuuming form.

Figure 10:
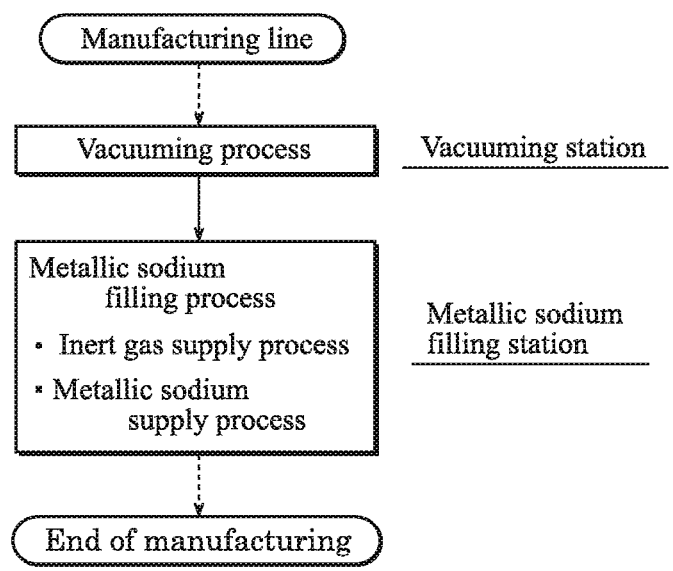
FIG. 10 is a process chart of manufacturing processes of a poppet valve according to a second embodiment.

(1) Also in the second embodiment, the vacuuming process and the inert gas supply process are executed for filling the inert gas into the valve intermediate W; however, in the second embodiment, as shown in FIG. 10, a vacuuming station Sv only executing the vacuuming process and a metallic sodium filling station Sf executing the inert gas supply process and the metallic sodium supply process are provided instead of the inert gas filling station Sg and the metallic sodium supply station Sm. The inert gas supplying apparatus 100 according to the second embodiment functions in both the vacuuming station Sv and the metallic sodium filling station Sf.

(2) Although the configuration of the first embodiment is basically utilized, the inert gas supplying apparatus 100 according to the second embodiment is different in a portion of the configuration.

Figure 11:
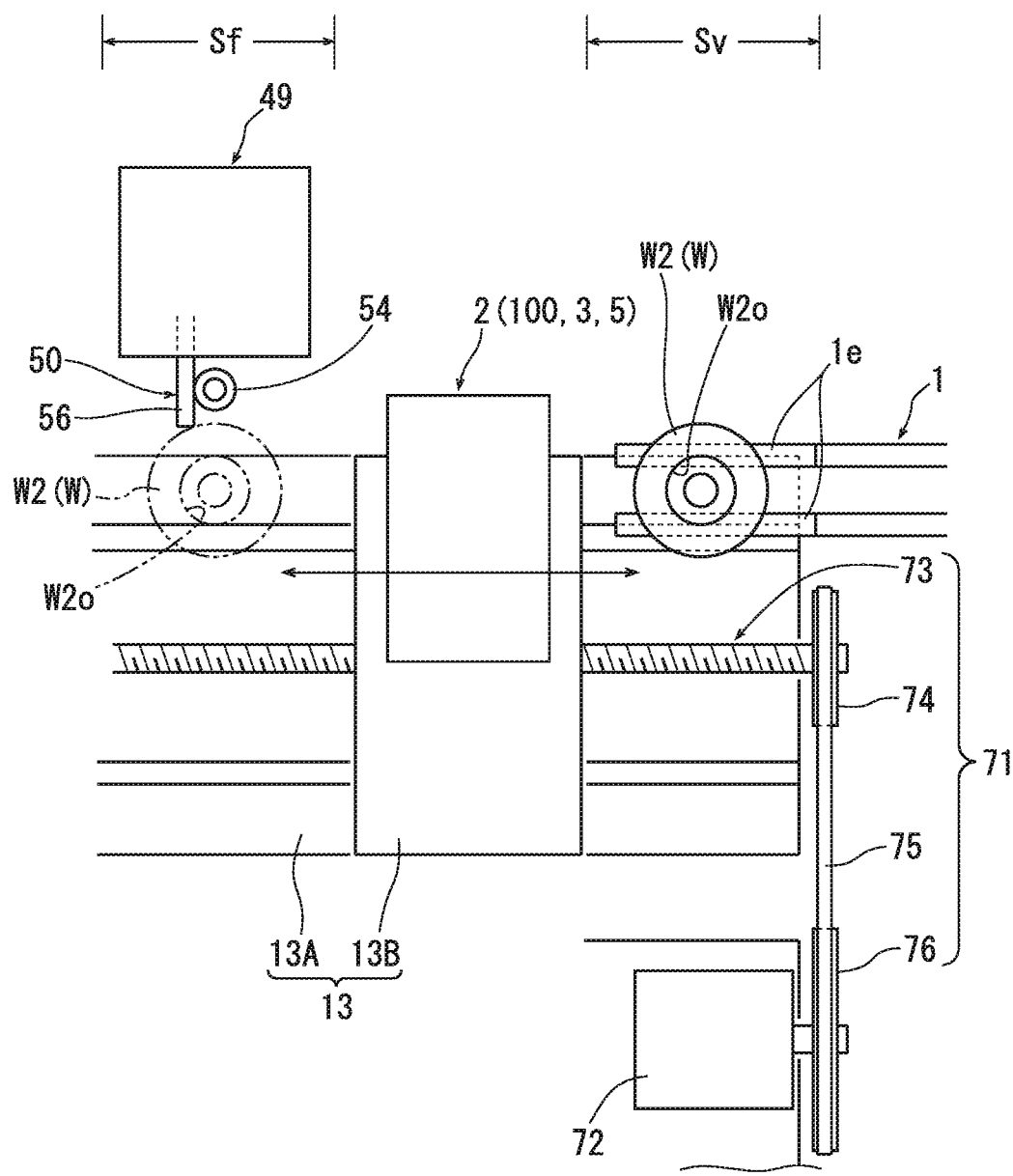
FIG. 11 is a simplified plane view of an arrangement relationship between a vacuuming station and a metallic sodium filling station in the second embodiment.
Figure 12:
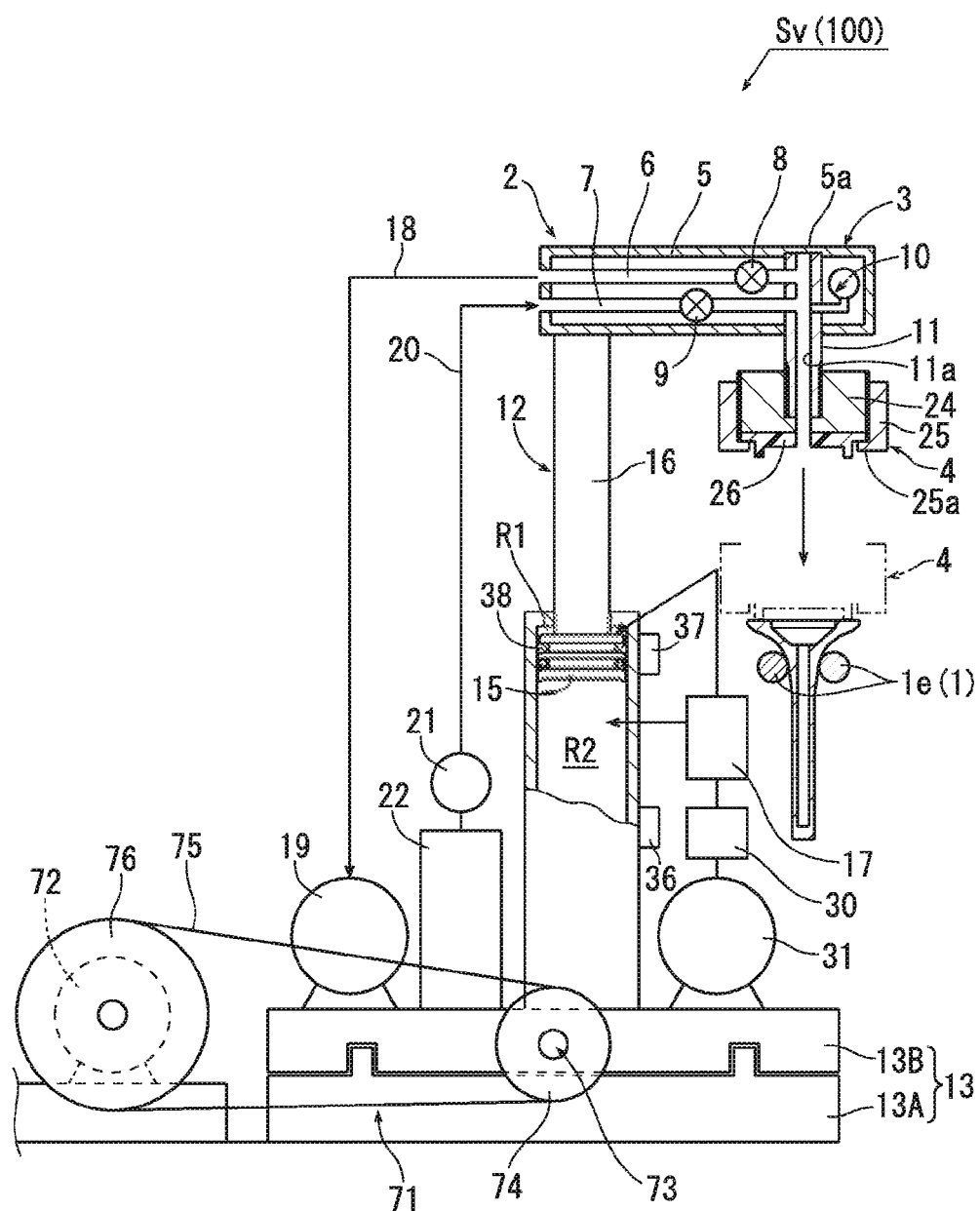
FIG. 12 is a partially cutaway side view for explaining an inert gas supplying apparatus according to the second embodiment.

(3) Although the inert gas supplying apparatus 100 according to the second embodiment includes the base 13, the base 13 is disposed on the other side in the parallel arrangement direction of the pair of the guide rails 1 (the lower side of FIG. 11), and the base 13 is made up of a fixed base 13A and a sliding base 13B sliding on the fixed base 13A in the direction in which the manufacturing line continues (the horizontal direction of FIG. 11). The sliding base 13B is linked through a power transmission mechanism 71 to a servomotor 72 acting as a drive source, and a ball screw structure 73 incorporated in the sliding base 13B acts along with a pulley 74, a belt 75, and a pulley 76 interposed between the ball screw structure (shaft part) 73 and the servomotor 72 as the power transmission mechanism 71 to transmit the drive force of the servomotor 72 as a reciprocating power to the sliding base 13B. As a result, the sliding base 13B moves between the vacuuming station Sv and the metallic sodium filling station Sf.

Figure 13:
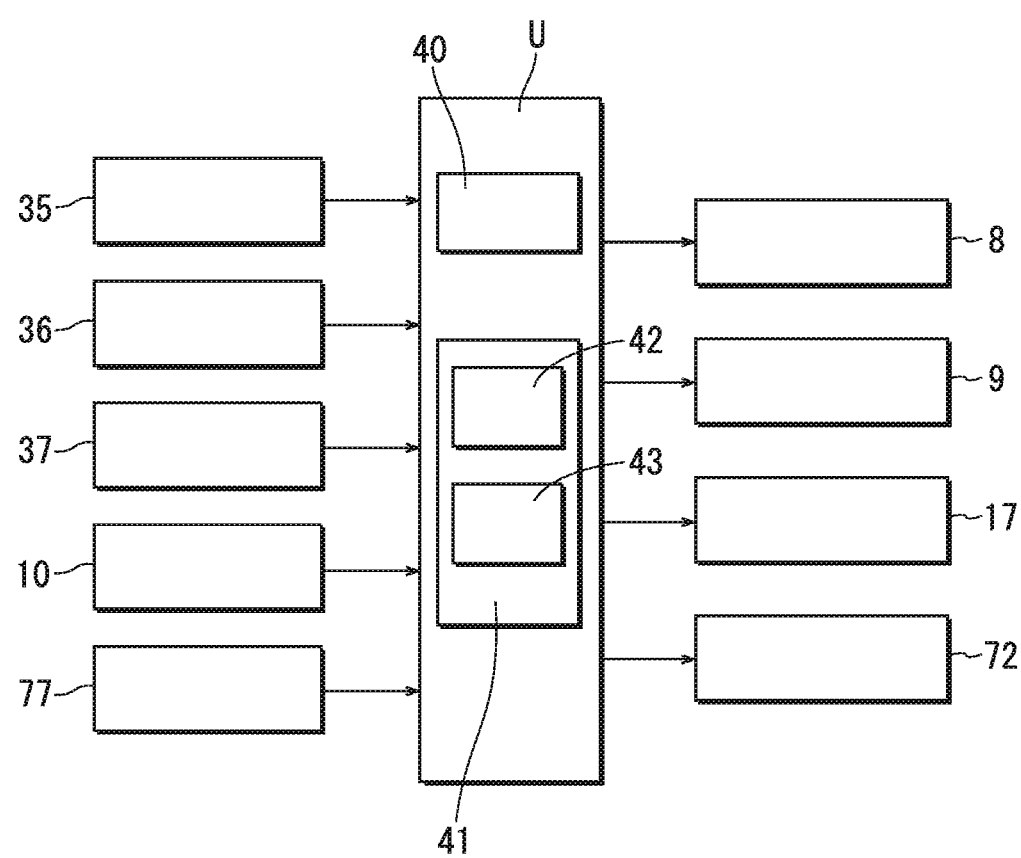
FIG. 13 is an explanatory diagram for explaining an input/output relationship in a control unit according to the second embodiment.

(4) As shown in FIG. 13, the control unit U according to the second embodiment inputs the pieces of information from the sensor (setting state detector) 35, the sensor (arrangement state detector) 36, the sensor 37, and the pressure gauge 10 (pressure detecting part) as well as information from an encoder 77 of the servomotor 72, and the control unit U outputs control signals to the solenoid valve 8, the solenoid valve 9, and the adjustment valve 17 as well as the servomotor 72.

Additionally; a distance of movement of the sliding base 13B between the vacuuming station Sv and the metallic sodium filling station St is set in the setting part 42 of the control unit U in addition to the setting details of the first embodiment.

Figure 14:
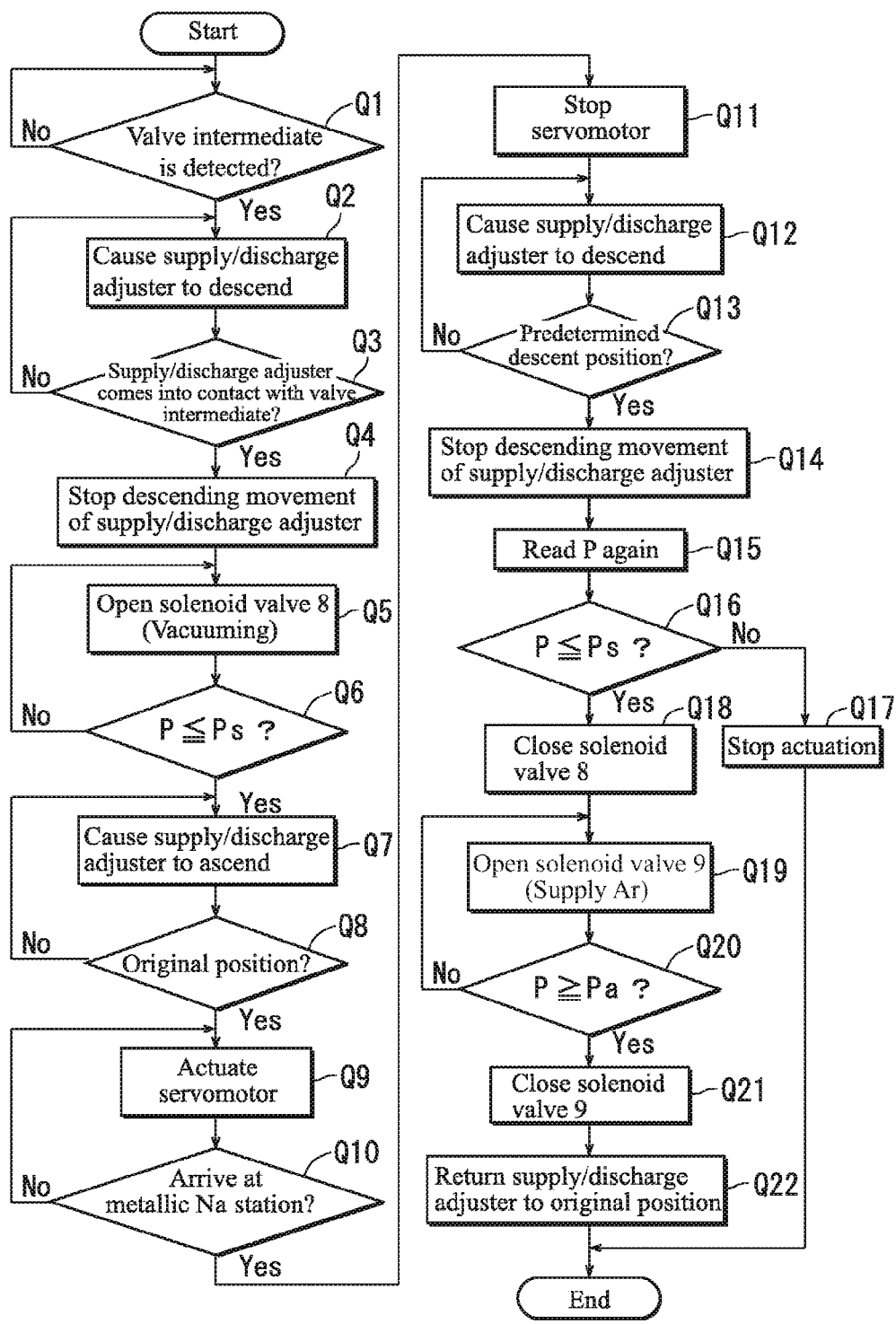
FIG. 14 is a flowchart of a control example of the control unit according to the second embodiment.

(5) A control example of the control unit U will specifically be described along with a series of actions with reference to a flowchart shown in FIG. 14 etc. It is noted that Q stands for a step.

(i) When the control is started, first, it is confirmed whether the valve intermediate W is present at the predetermined position P1 of the conveying-direction terminal end portion 1e of the pair of the guide rails 1 (Q1) and, if the presence of the valve intermediate W is confirmed, the supply/discharge adjuster 2 is caused to descend by the telescopic cylinder apparatus 12 (Q2). When it is confirmed that this descent brings the contact unit 4 (the projecting part 27 of the pad 26) into contact with the leading end surface of the head-part opening circumferential edge portion W2f of the valve intermediate W (see a virtual line of the contact unit 4 of FIG. 12) (located at a first working position) (Q3), the descending movement of the supply/discharge adjuster 2 is stopped and the solenoid valve 8 is opened to perform vacuuming for the internal space Win in the sealed state in the valve intermediate W (Q4, Q5). As a result, as is the case with the first embodiment, the air initially present in the internal space Win in the valve intermediate W is discharged.

Figure 15:
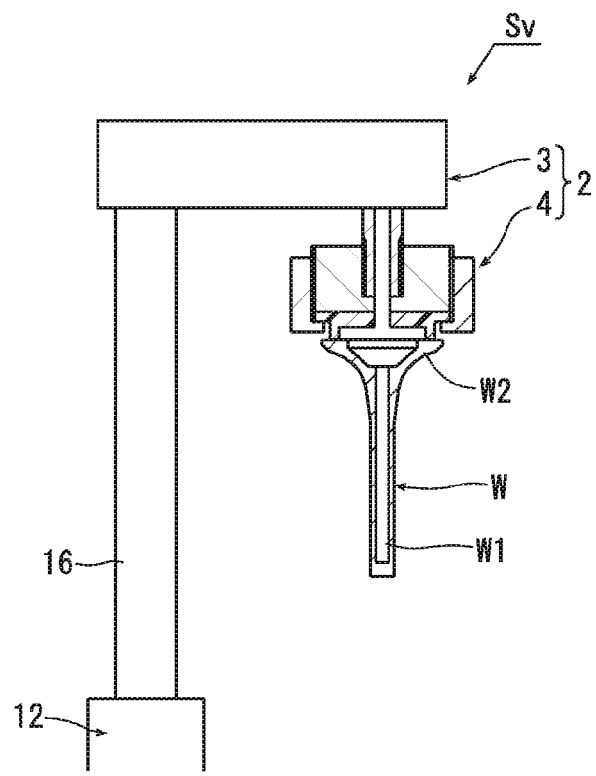
FIG. 15 is a view of a state in which the poppet valve intermediate sucked to the supply/discharge adjuster is moved up as the supply/discharge adjuster ascends.

(ii) After the vacuuming is started at Q5, it is determined at Q6 whether the pressure P of the internal space Win in the valve intermediate W becomes equal to or lower than the setting pressure Ps lower than the ambient pressure of the valve intermediate W (in this embodiment, the same pressure as the atmospheric pressure) and, if this is confirmed, the extensible rod 16 of the telescopic cylinder apparatus 12 is extended to cause the supply/discharge adjuster 2 to ascend as shown in FIG. 15 (Q7). The sensor 37 detects whether the supply/discharge adjuster 2 has reached the original position due to the ascent of the supply/discharge adjuster 2 and, if it is confirmed from the detection by the sensor 37 that the supply/discharge adjuster 2 has reached the original position (Q8), the servomotor 72 is driven and the drive force of the servomotor 72 is transmitted through the pulley 76, the belt 75, the pulley 74, and the ball screw structure 73 to the sliding base 13B. As a result, the sliding base 13B is moved to the metallic sodium filling station Sf and, accordingly, the valve intermediate W sucked to the supply/discharge adjuster 2 is also conveyed in a hung state to the metallic sodium filling station Sf (Q9).

In this case, the nozzle 61 of the inert-gas ejecting apparatus 60 is located at a retreat position, and the retreat position in this embodiment is set in consideration of not only the valve intermediate W but also the supply/discharge adjuster 2 to a position at which the valve intermediate W and the supply/discharge adjuster 2 do not interfere with the nozzle 61 or the setting base 47 during conveying.

Since the supply/discharge adjuster 2 sucks the leading end surface of the head part W2 having a large area and the sucking relationship of the supply/discharge adjuster 2 and the head part W2 is strong when the valve intermediate W is conveyed, the valve intermediate W does not drop off from the supply/discharge adjuster 2 even if the valve intermediate W is swung during conveying.

Figure 16:
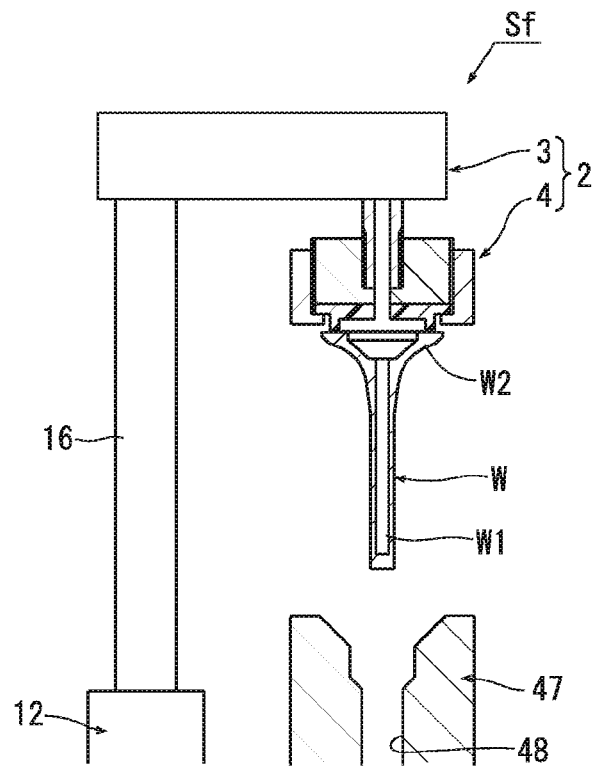
FIG. 16 is a view of a state in which the poppet valve intermediate sucked to the supply/discharge adjuster is located above a setting base of the metallic sodium filling station by a drive of a servomotor.

(iii) As a result of the movement of the sliding base 13B, as shown in FIG. 16, when the valve intermediate W sucked to the supply/discharge adjuster 2 reaches above the setting base 47 (setting hole) and this is determined by the control unit U based on the information from the encoder 77 (Q10), the servomotor 72 is halted to stop the sliding base 13B, and the extensible rod 16 of the telescopic cylinder apparatus 12 is retracted to cause the supply/discharge adjuster 2 to descend (Q12). Because of this descent, as shown in FIG. 17, the valve intermediate W sucked to the supply/discharge adjuster 2 is inserted from the stem part W1 into the setting hole 48 and, when it is confirmed with the sensor 36 that the supply/discharge adjuster 2 has reached a predetermined descent position (second working position) (the valve intermediate W is in the set state in the setting base 47) (Q13), the retracting movement of the extensible rod 16 is halted to stop the descending movement of the supply/discharge adjuster 2 (Q14).

Figure 17:
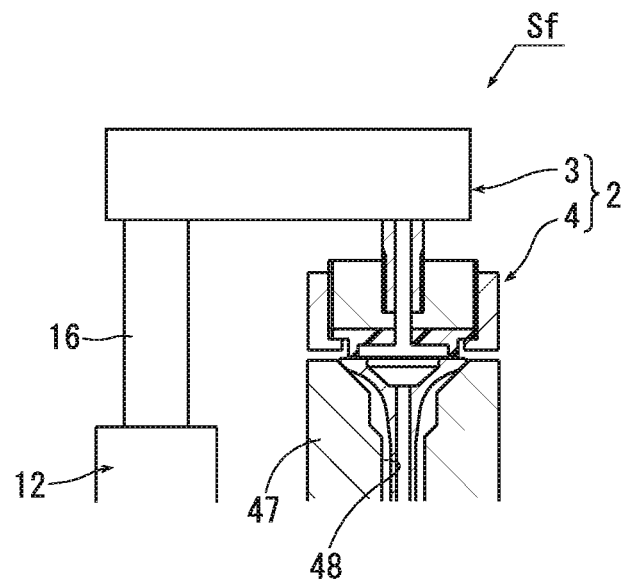
FIG. 17 is a view of a state in which the poppet valve intermediate sucked to the supply/discharge adjuster is set in a setting hole of the setting base due to a descent of the supply/discharge adjuster with an inert gas supplied into the poppet valve intermediate on the setting base.

(iv) When the descending movement of the supply/discharge adjuster 2 is stopped, the pressure P in the valve intermediate W is read again by the pressure gauge 10 under the state in which the supply/discharge adjuster 2 sucks the valve intermediate W (the state of FIG. 17). If the detected pressure P is not equal to or less than the setting pressure Ps, the actuation is stopped because it is considered that the suction is defective due to a positional displacement etc., whereas if it is recognized that the detected pressure P is maintained at the setting pressure Ps or lower, the solenoid valve 8 is closed and the solenoid valve 9 is opened to supply the inert gas instead of the vacuuming (Q18, Q19).

Figure 18:
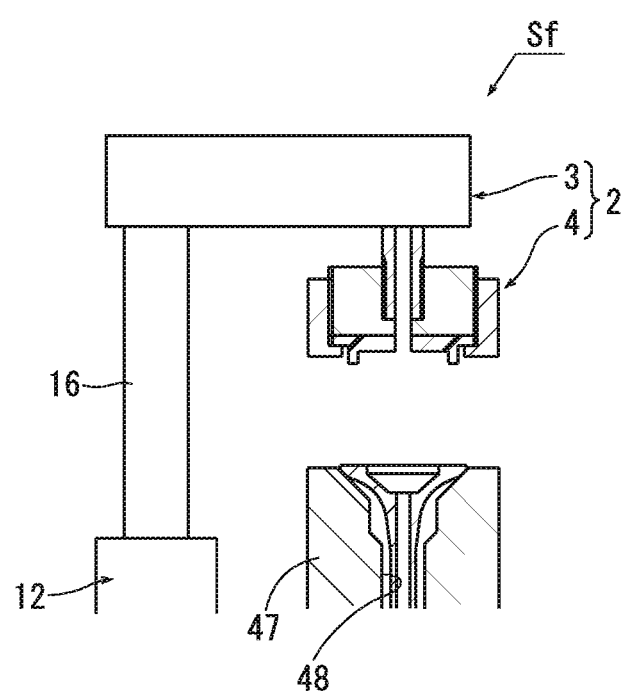
FIG. 18 is an explanatory view for explaining a state in which the supply/discharge adjuster is separated from the poppet valve intermediate after completion of supply of the inert gas into the poppet valve intermediate.
Figure 19:
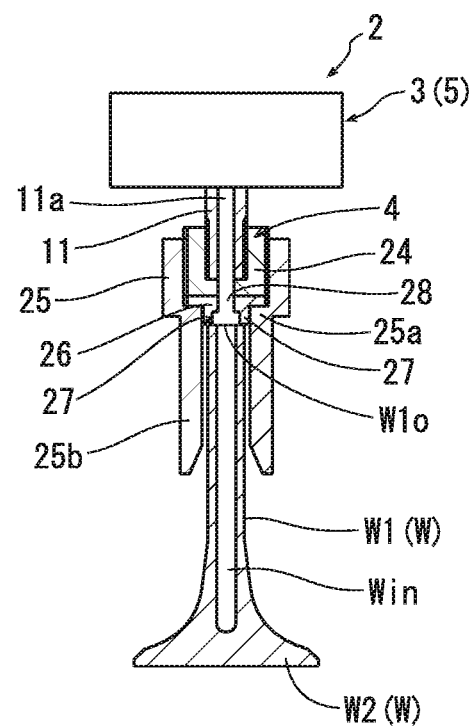
FIG. 19 is a longitudinal sectional view for explaining a supply/discharge adjuster (contact unit) according to a third embodiment.

(v) When the inert gas is supplied into the valve intermediate W and it is confirmed that the inside of the valve intermediate W becomes equal to or greater than the ambient pressure Pa, the solenoid valve 9 is closed to stop the supply of the inert gas (Q21) and the supply/discharge adjuster 2 is returned to the original position as shown in FIG. 18 (Q22).

Subsequently, the metallic sodium filling station supplies the metallic sodium into the valve intermediate W with the same method as the first embodiment and, when the supply is completed, the valve intermediate W storing the metallic sodium is conveyed to the next station.

(6) Therefore, also in the second embodiment, the inert gas can be supplied into the valve intermediate W without wasting the inert gas and, furthermore, the supply/discharge adjuster 2 can be used as a conveying tool conveying the valve intermediate W by utilizing the form in which the supply/discharge adjuster 2 performs the vacuuming of the valve intermediate W.

9. The third embodiment shown in FIG. 19 is a variation example of the second embodiment.

In the third embodiment, the valve intermediate W used as an object to be supplied with an inert gas is closed on the leading end surface of the head part W2 and has an opening W1o formed in the leading end surface of the stem part W1 such that the internal space Win communicates with the outside through the opening W1o. Therefore, because of the need to perform the vacuuming and the supply of the inert gas through the leading end surface opening W1o of the stem part W1, the contact unit 4 of the supply/discharge adjuster 2 is generally reduced in diameter as compared to the unit according to the second embodiment, and the leading end surface of the projecting part 27 of the pad 26 can come into contact with the leading end surface of the stem part W1.

Additionally, the cap 25 of the contact unit 4 has a cylindrical guide part 25b (guide member) formed integrally with a circumferential edge portion of a leading end of the locking part 25a. The guide part 25b extends downward from the circumferential edge portion of the leading end of the locking part 25a and has the inner diameter allowing the insertion of the stem part W1 of the valve intermediate W.

Therefore, when the contact unit 4 (the supply/discharge adjuster 2) sucks the leading end surface of the stem part W1 of the valve intermediate W in the vacuuming process, the stem part W1 is inserted into the guide part 25b as shown in FIG. 19 and, even if a force causing the valve intermediate W to swing is applied when the contact unit 4 is conveyed to the metallic sodium filling station Sf while sucking the leading end surface of the stem part W1 of the valve intermediate W, the swinging is regulated by the guide part 25b. As a result, when the contact unit 4 (the supply/discharge adjuster 2) conveys the valve intermediate W, the contact unit 4 (the supply/discharge adjuster 2) can be prevented from coming off from valve intermediate W.

10. Although the embodiments have been described, the present invention include the following forms.

(1) The inert gas atmosphere in the manufacturing line is made higher than the atmospheric pressure.

(2) The manufacturing line is operated under the atmosphere (atmospheric pressure). In this case, argon is preferable for the inert gas filled into the valve intermediate W.

(3) When nitrogen is used as the inert gas, the manufacturing line is preferably under an inert gas atmosphere. More preferably, the pressure of the atmosphere is made equal to or greater than the atmospheric pressure.

(4) Na—K alloy is used as the cooling medium metal.

(5) If the performance of the vacuum pump 19 is low, the vacuuming and the supply of the inert gas are repeated several times to increase the proportion of the inert gas in the valve intermediate W finally to a desired level.

(6) Various mechanisms can be used as the ascending/descending mechanism.

(7) The telescopic cylinder apparatus 12 is not limited to an air cylinder and may be achieved by using a hydraulic cylinder.

EXPLANATIONS OF LETTERS OR NUMERALS 1e conveying-direction terminal end portion (support) of pair of guide rails
2 supply/discharge adjuster
4 contact unit (supply/discharge adjuster)
8 solenoid valve (negative-pressure suction adjusting part)
9 solenoid valve (inert gas supply adjusting part)
10 pressure gauge (pressure detecting part)
12 telescopic cylinder apparatus (ascending/descending mechanism, conveying mechanism)
13B sliding base (conveying mechanism)
25 cap
25b guide part (guide member)
28 supply/discharge passage
35 sensor (setting state detector)
36 sensor (arrangement state detector, first arrangement state detector, second arrangement state detector)
37 sensor 71 power transmission mechanism (conveying mechanism)
72 servomotor (conveying mechanism)
73 ball screw structure
77 encoder (second arrangement state detector)
100 inert gas supplying apparatus
Sg inert gas filling station
Sf metallic sodium filling station (supply station of metallic sodium)
W poppet valve intermediate
W2 head part of poppet valve intermediate (diameter expansion part)
W2o head-part opening (opening on one axial end side of poppet valve intermediate)
W2f head-part opening circumferential edge portion (opening circumferential edge portion on one axial end side of poppet valve intermediate)
Win internal space of poppet valve intermediate
W1 stem part of poppet valve intermediate
W1o stem part opening (opening on one axial end side of poppet valve intermediate)
W1f stem part opening circumferential edge portion (opening circumferential edge portion on one axial end side of poppet valve intermediate)
P pressure inside internal space in poppet valve intermediate
Ps setting pressure
Pa ambient pressure
P1 predetermined position on conveying-direction terminal end portion of pair of guide rails
U control unit

The invention claimed is:

1. A method for supplying inert gas into a poppet valve intermediate with a supply/discharge adjuster, the poppet valve intermediate having an internal space with an opening on one axial end side, and being arranged with the opening on one axial end side facing upward, the supply/discharge adjuster supplying inert gas to the opening on one axial end side of the poppet valve intermediate before a cooling medium metal is supplied into the internal space of the poppet valve intermediate, comprising the steps of:
   closing the opening on the one axial end side of the poppet valve intermediate with the supply/discharge adjuster,
   achieving a negative pressure by negative-pressure suction in the internal space of the poppet valve intermediate as compared to an ambient pressure of the poppet valve intermediate, and
   supplying the inert gas from the supply/discharge adjuster to the internal space until a pressure of the internal space reaches the ambient pressure of the poppet valve intermediate.

2. The method for supplying inert gas into a poppet valve intermediate according to claim 1, wherein
   the supply/discharge adjuster is capable of switching adjustment between a negative-pressure suction and a supply of inert gas, and wherein
   the supply/discharge adjuster is brought into contact with an opening circumferential edge portion on the one axial end side of the poppet valve intermediate to close the opening on one axial end side of the poppet valve intermediate,
   the negative-pressure suction is then performed through adjustment of the supply/discharge adjuster to make the pressure inside the internal space of the poppet valve intermediate lower than the ambient pressure of the poppet valve intermediate, and wherein
   the inert gas is then supplied through the switching adjustment of the supply/discharge adjuster into the internal space of the poppet valve intermediate until the inside of the internal space reaches the ambient pressure of the poppet valve intermediate.

3. The method for supplying inert gas into a poppet valve intermediate according to claim 2, wherein
   the supply/discharge adjuster is also used as a conveying tool to convey the supply/discharge adjuster to a supply station of the cooling medium metal constituting the next process while the poppet valve intermediate is sucked to the supply/discharge adjuster based on the negative-pressure suction, and wherein
   after the supply/discharge adjuster is conveyed to the cooling medium metal supply station, the switching adjustment of the supply/discharge adjuster is performed to supply the inert gas into the internal space of the poppet valve intermediate.

4. The method for supplying inert gas into a poppet valve intermediate according to claim 3, wherein
   the poppet valve intermediate is prepared that has an opening on one axial end side thereof opened in a leading end surface of a diameter expansion part of the poppet valve intermediate, and wherein
   when the poppet valve intermediate is sucked to the supply/discharge adjuster based on the negative-pressure suction, the leading end surface of the diameter expansion part of the poppet valve intermediate is sucked to the supply/discharge adjuster.

5. The method for supplying inert gas into a poppet valve intermediate according to claim 2, wherein
   both operations of the negative-pressure suction and the supply of the inert gas to the inside of the internal space of the poppet valve intermediate are performed at the same working position, and wherein
   after completion of both of the operations, the poppet valve intermediate is conveyed to a supply station of the cooling medium metal constituting the next process.

6. The method for supplying inert gas into a poppet valve intermediate according to claim 2, wherein
   the supply/discharge adjuster is used that includes a supply/discharge passage for selectively performing the negative-pressure suction and the supply of the inert gas, wherein the supply/discharge passage has an opening opened to the outside, and wherein
   when the supply/discharge adjuster comes into contact with the opening circumferential edge portion on one axial end side of the poppet valve intermediate, the opening of the supply/discharge passage faces the opening on one axial end side of the poppet valve intermediate.

7. The method for supplying inert gas into a poppet valve intermediate according to claim 2, wherein
   the negative-pressure suction and the supply of the inert gas are repeated multiple times.

8. The method for supplying inert gas into a poppet valve intermediate according to claim 1, wherein
   nitrogen or argon is used as the inert gas.

9. The method for supplying inert gas into a poppet valve intermediate according to claim 8, wherein
   at least an ambient atmosphere of the poppet valve intermediate is an inert gas atmosphere.

10. The method for supplying inert gas into a poppet valve intermediate according to claim 1, wherein
   the ambient pressure of the poppet valve intermediate is the same pressure as the atmospheric pressure.

11. An apparatus for supplying inert gas into a poppet valve intermediate in which an object to be supplied with inert gas is a poppet valve intermediate having an internal space with an opening on one axial end side, the apparatus having a support supporting the poppet valve intermediate with the opening on one axial end side facing upward, the inert gas being supplied from the opening on one axial end side of the poppet valve intermediate into the internal space of the poppet valve intermediate while the poppet valve intermediate is supported by the support, the apparatus comprising:

a supply/discharge adjuster arranged to be capable of coming into contact with and separating from an opening circumferential edge portion on one axial end side of the poppet valve intermediate, the supply/discharge adjuster closing the opening on one axial end side when coming into contact with the opening circumferential edge portion on one axial end side of the poppet valve intermediate, wherein the supply/discharge adjuster is set to have achievable switching forms including a negative-pressure suction form and an inert gas supply form, wherein in the negative-pressure suction form, when the supply/discharge adjuster is located on the opening circumferential edge portion on one axial end side of the poppet valve intermediate, negative-pressure suction is performed in the internal space of the poppet valve intermediate until reaching a setting pressure lower than an ambient pressure of the poppet valve intermediate, and wherein in the inert gas supply form, when the pressure inside the internal space of the poppet valve intermediate reaches the setting pressure due to the negative-pressure suction form, the inert gas is supplied into the internal space of the poppet valve intermediate until the pressure inside the internal space reaches the ambient pressure of the poppet valve intermediate.

12. The apparatus for supplying inert gas into a poppet valve intermediate according to claim 11, wherein the supply/discharge adjuster includes a supply/discharge passage for selectively performing the negative-pressure suction and the supply of the inert gas, and wherein the supply/discharge passage has an opening facing the opening on one axial end side when the supply/discharge adjuster comes into contact with the opening circumferential edge portion on one axial end side of the poppet valve intermediate.

13. The apparatus for supplying inert gas into a poppet valve intermediate according to claim 12, comprising a conveying mechanism conveying the supply/discharge adjuster as a conveying tool, wherein
the conveying mechanism is set to reciprocate the supply/discharge adjuster between a first working position on the opening circumferential edge portion on one axial end side of the poppet valve intermediate and a second working position for the next process, and wherein
the supply/discharge adjuster is set to perform the negative-pressure suction form when moving from the first working position to the second working position and performs the inert gas supply form instead of the negative-pressure suction form when arriving at the second working position.

14. The apparatus for supplying inert gas into a poppet valve intermediate according to claim 13, wherein
the poppet valve intermediate is used that has an opening on one axial end side opened in a leading end surface of a stem part of the poppet valve intermediate, wherein
the supply/discharge adjuster includes a cylindrical guide member extending downward around the opening of the supply/discharge passage, and wherein the inner diameter of the guide member set to allow insertion of the stem part of the poppet valve intermediate.

15. The apparatus for supplying inert gas into a poppet valve intermediate according to claim 13, comprising
a setting state detector detecting that the poppet valve intermediate is supported by the support, a first arrangement state detector detecting that the supply/discharge adjuster is located at the first working position, a second arrangement state detector detecting that the supply/discharge adjuster is located at the second working position, and a control unit controlling the conveying mechanism and the supply/discharge adjuster, wherein
the supply/discharge adjuster includes a pressure detecting part detecting the pressure inside the internal space of the poppet valve intermediate, a negative-pressure suction adjusting part adjusting the negative-pressure suction for the internal space of the poppet valve intermediate, and an inert gas supply adjusting part adjusting the supply of the inert gas to the internal space of the poppet valve intermediate, and wherein
the control unit is set to control the conveying mechanism to convey the supply/discharge adjuster toward the first working position when it is determined based on information from the setting state detector that the poppet valve intermediate is supported by the support, to control the negative-pressure suction adjusting part to perform the negative-pressure suction of the internal space in the poppet valve intermediate and to control the conveying mechanism to convey the supply/discharge adjuster to the second working position when it is determined based on information from the first arrangement state detector that the supply/discharge adjuster is located at the first working position, to control the negative-pressure suction adjusting part to stop the negative-pressure suction and to control the inert gas supply adjusting part to supply the inert gas to the internal space when it is determined based on information from the second arrangement state detector that the supply/discharge adjuster is located at the second working position, and to control the inert gas supply adjusting part to stop the supply of the inert gas and to control the conveying mechanism to move the supply/discharge adjuster away from the second working position when it is determined based on information from the pressure detecting part that the pressure inside the internal space has reached the ambient pressure of the poppet valve intermediate.

16. The apparatus for supplying inert gas into a poppet valve intermediate according to claim 12, comprising
an ascending/descending mechanism causing the supply/discharge adjuster to vertically ascend and descend in a region above the poppet valve intermediate supported by the support, wherein
the ascending/descending mechanism is set to cause the supply/discharge adjuster to descend on the opening circumferential edge portion on one axial end side of the poppet valve intermediate when the negative-pressure suction form is performed, and to ascend when the pressure inside the internal space of the poppet valve intermediate reaches the ambient pressure of the poppet valve intermediate after the negative-pressure suction form is performed.

17. The apparatus for supplying inert gas into a poppet valve intermediate according to claim 16, comprising a setting state detector detecting that the poppet valve intermediate is supported by the support, an arrangement state detector detecting that the supply/discharge adjuster is located on the opening circumferential edge portion on one axial end side of the poppet valve intermediate supported by the support, and a control unit controlling the ascending/descending mechanism and the supply/discharge adjuster, wherein the supply/discharge adjuster includes a pressure detecting part detecting the pressure inside the internal space of the poppet valve intermediate, a negative-pressure suction adjusting part adjusting the negative-pressure suction for the internal space of the poppet valve intermediate, and an inert gas supply adjusting part adjusting the supply of the inert gas to the internal space of the poppet valve intermediate, and wherein the control unit is set to control the ascending/descending mechanism to cause the supply/discharge adjuster to descend toward the poppet valve intermediate when it is determined based on information from the setting state detector that the poppet valve intermediate is supported by the support, to control the negative-pressure suction adjusting part to start the negative-pressure suction of the internal space in the poppet valve intermediate when it is determined based on information from the arrangement state detector that the supply/discharge adjuster is located on the opening circumferential edge portion on one axial end side of the poppet valve intermediate, to control the negative-pressure suction adjusting part to stop the negative-pressure suction and to control the inert gas supply adjusting part to supply the inert gas to the internal space when it is determined based on information from the pressure detecting part that the pressure inside the internal space has reached the setting pressure lower than the ambient pressure of the poppet valve intermediate, and to control the inert gas supply adjusting part to stop the supply of the inert gas and to control the ascending/descending mechanism to cause the supply/discharge adjuster to ascend when it is determined based on information from the pressure detecting part that the pressure inside the internal space has reached the ambient pressure of the poppet valve intermediate.

18. The apparatus for supplying inert gas into a poppet valve intermediate according to claim 12, comprising an arrangement state detector detecting that the supply/discharge adjuster is located on the opening circumferential edge portion on one axial end side of the poppet valve intermediate supported by the support, and a control unit controlling the supply/discharge adjuster, wherein the supply/discharge adjuster includes a pressure detecting part detecting the pressure inside the internal space of the poppet valve intermediate, a negative-pressure suction adjusting part adjusting the negative-pressure suction for the internal space of the poppet valve intermediate, and an inert gas supply adjusting part adjusting the supply of the inert gas to the internal space of the poppet valve intermediate, and wherein the control unit is set to control the negative-pressure suction adjusting part to start the negative-pressure suction of the internal space in the poppet valve intermediate when it is determined based on information from the arrangement state detector that the supply/discharge adjuster is located on the opening circumferential edge portion on one axial end side of the poppet valve intermediate, to control the negative-pressure suction adjusting part to stop the negative-pressure suction and to control the inert gas supply adjusting part to supply the inert gas to the internal space when it is determined based on information from the pressure detecting part that the pressure inside internal space has reached the setting pressure lower than the ambient pressure of the poppet valve intermediate, and to control the inert gas supply adjusting part to stop the supply of the inert gas when it is determined based on information from the pressure detecting part that the pressure inside the internal space has reached the ambient pressure of the poppet valve intermediate.

19. The apparatus for supplying inert gas into a poppet valve intermediate according to claim 11, wherein
nitrogen or argon is used as the inert gas.

20. The apparatus for supplying inert gas into a poppet valve intermediate according to claim 19, wherein
at least an ambient atmosphere of the poppet valve intermediate is an inert gas atmosphere.

21. The apparatus for supplying inert gas into a poppet valve intermediate according to claim 11, wherein
the ambient pressure of the poppet valve intermediate is the same pressure as the atmospheric pressure.

* * * * *